(12) United States Patent
Hashimoto et al.

(10) Patent No.: US 12,513,333 B2
(45) Date of Patent: Dec. 30, 2025

(54) VIDEO DECODING APPARATUS AND VIDEO CODING APPARATUS

(71) Applicant: Sharp Kabushiki Kaisha, Sakai (JP)

(72) Inventors: Tomonori Hashimoto, Sakai (JP); Tomohiro Ikai, Sakai (JP); Yukinobu Yasugi, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/839,075

(22) PCT Filed: Feb. 20, 2023

(86) PCT No.: PCT/JP2023/005934
§ 371 (c)(1),
(2) Date: Aug. 16, 2024

(87) PCT Pub. No.: WO2023/162920
PCT Pub. Date: Aug. 31, 2023

(65) Prior Publication Data
US 2025/0168405 A1 May 22, 2025

(30) Foreign Application Priority Data
Feb. 22, 2022 (JP) .................. 2022-025299

(51) Int. Cl.
*H04N 11/02* (2006.01)
*H04N 19/12* (2014.01)
(Continued)

(52) U.S. Cl.
CPC ............. *H04N 19/61* (2014.11); *H04N 19/12* (2014.11); *H04N 19/18* (2014.11); *H04N 19/196* (2014.11)

(58) Field of Classification Search
CPC ........ H04N 19/61; H04N 19/12; H04N 19/18; H04N 19/196
(Continued)

(56) References Cited

U.S. PATENT DOCUMENTS 12,309,396 B2 * 5/2025 Lee ...................... H04N 19/132
2013/0044808 A1 * 2/2013 Nakagawa ........... H04N 19/105
375/240.03
(Continued)

FOREIGN PATENT DOCUMENTS

WO 2018/110281 A1 6/2018

OTHER PUBLICATIONS

Official Communication issued in International Patent Application No. PCT/JP2023/005934, mailed on May 9, 2023, 4 pages.
(Continued)

*Primary Examiner* — Jayanti K Patel
*Assistant Examiner* — Richard B Carter
(74) *Attorney, Agent, or Firm* — Keating & Bennett, LLP

(57) ABSTRACT

Video coding and decoding apparatuses that can enhance coding efficiency are provided. A video decoding apparatus according to an aspect of the present invention includes a parameter decoder configured to decode a transform coefficient and a coefficient sign prediction error from coded data, and a sign prediction unit configured to predict a sign of the transform coefficient. The sign prediction unit derives a cost with reference to a boundary pixel with a neighboring block for a candidate of a combination of signs of transform coefficients without sign information, selects the sign, based on the cost, and modifies the predicted transform coefficient sign, using the coefficient sign prediction error decoded by the parameter decoder. The sign prediction unit divides the transform coefficients without the sign information into multiple groups, and performs the prediction on a transform
(Continued)

coefficient of the transform coefficients for each of the multiple groups.

11 Claims, 18 Drawing Sheets

(51) Int. Cl.
*H04N 19/18* (2014.01)
*H04N 19/196* (2014.01)
*H04N 19/61* (2014.01)

(58) Field of Classification Search
USPC .................................. 375/240.12, 240.03
See application file for complete search history.

(56) References Cited

U.S. PATENT DOCUMENTS

| | | | |
|---|---|---|---|
| 2019/0208225 A1* | 7/2019 | Chen | H04N 19/176 |
| 2021/0014509 A1* | 1/2021 | Filippov | H04N 19/48 |
| 2021/0250580 A1* | 8/2021 | Chen | H04N 19/105 |
| 2025/0039377 A1* | 1/2025 | Xiu | H04N 19/91 |
| 2025/0193451 A1* | 6/2025 | Chiang | H04N 19/61 |

OTHER PUBLICATIONS

Chen et al., "EE2-4.3 related: More combined test results for sign prediction", Joint Video Experts Team (JVET) of ITU-T SG 16 WP 3 and ISO/IEC JTC 1/SC 29, JVET-Y0141-v1, Jan. 12-21, 2022, pp. 1-5.

Henry et al., "Residual Coefficient Sign Prediction", Joint Video Exploration Team (JVET) of ITU-T SG 16 WP 3 and ISO/IEC JTC 1/SC 29/WG 11, JVET-D0031, Oct. 15-21, 2016, pp. 1-6.

Chien et al., "Hybrid Video Codec Based on Flexible Block Partitioning With Extensions to the Joint Exploration Model", IEEE Transactions on Circuits and Systems For Video Technology, vol. 30, No. 5, May 2020, 15 pages.

* cited by examiner (a)

| seq_parameter_set_rbsp( ) { | Descriptor |
|---|---|
| sps_seq_parameter_set_id | u(4) |
| sps_video_parameter_set_id | u(4) |
| ... | |
| sps_sign_prediction_enabled_flag | u(1) |
| if( sps_sign_prediction_enabled_flag ) | |
|    sps_num_pred_signs | u(3) |
| ... | |
| sps_lfnst_enabled_flag | u(1) |
| ... | |
| sps_explicit_scaling_list_enabled_flag | u(1) |
| if( sps_lfnst_enabled_flag && sps_explicit_scaling_list_enabled_flag ) | |
|    sps_scaling_matrix_for_lfnst_disabled_flag | u(1) |
| ... | |
| } | |

(b)

| slice_header( ) { | Descriptor |
|---|---|
| sh_picture_header_in_slice_header_flag | u(1) |
| if( sh_picture_header_in_slice_header_flag ) | |
| ... | |
| if( sps_sign_prediction_enabled_flag ) { | |
|    sh_sign_prediction_used_flag | u(1) |
| ... | |
| } | |

FIG. 7

| residual_coding( x0, y0, log2TbWidth, log2TbHeight, cIdx ) { | Descriptor |
|---|---|
| ... | |
| QState = 0 | |
| for( i = lastSubBlock; i >= 0; i-- ) { | |
|   startQStateSb = QState | |
|   xS = DiagScanOrder[ log2TbWidth − log2SbW ][ log2TbHeight − log2SbH ][ i ][ 0 ] | |
|   yS = DiagScanOrder[ log2TbWidth − log2SbW ][ log2TbHeight − log2SbH ][ i ][ 1 ] | |
|   inferSbDcSigCoeffFlag = 0 | |
|   if( i < lastSubBlock && i > 0 ) { | |
|     sb_coded_flag[ xS ][ yS ] | ae(v) |
|     inferSbDcSigCoeffFlag = 1 | |
|   } | |
|   ... | |
|   for( n = firstPosMode0; n >= 0 && remBinsPass1 >= 4; n-- ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( sb_coded_flag[ xS ][ yS ] && ( n > 0 \|\| !inferSbDcSigCoeffFlag ) && <br>       ( xC != LastSignificantCoeffX \|\| yC != LastSignificantCoeffY ) ) { | |
|       sig_coeff_flag[ xC ][ yC ] | ae(v) |
|       ... | |
|     } | |
|     if( sig_coeff_flag[ xC ][ yC ] ) { | |
|       abs_level_gtx_flag[ n ][ 0 ] | ae(v) |
|       remBinsPass1-- | |
|       if( abs_level_gtx_flag[ n ][ 0 ] ) { | |
|         par_level_flag[ n ] | ae(v) |
|         remBinsPass1-- | |
|         abs_level_gtx_flag[ n ][ 1 ] | ae(v) |
|         remBinsPass1-- | |
|       } | |
|       ... | |
|     } | |
|     AbsLevelPass1[ xC ][ yC ] = sig_coeff_flag[ xC ][ yC ] + par_level_flag[ n ] + <br>       abs_level_gtx_flag[ n ][ 0 ] + 2 * abs_level_gtx_flag[ n ][ 1 ] | |
|     if( sh_dep_quant_used_flag ) | |
|       QState = QStateTransTable[ QState ][ AbsLevelPass1[ xC ][ yC ] & 1 ] | |
|     firstPosMode1 = n − 1 | |
|   } | |
|   for( n = firstPosMode0; n > firstPosMode1; n-- ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( abs_level_gtx_flag[ n ][ 1 ] ) | |
|       abs_remainder[ n ] | ae(v) |
|     AbsLevel[ xC ][ yC ] = AbsLevelPass1[ xC ][ yC ] + 2 * abs_remainder[ n ] | |
|   } | |
|   for( n = firstPosMode1; n >= 0; n-- ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( sb_coded_flag[ xS ][ yS ] ) | |
|       dec_abs_level[ n ] | ae(v) |

FIG. 8

| | |
|---|---|
| if( AbsLevel[ xC ][ yC ] > 0 ) { | |
|   if( lastSigScanPosSb = = −1 ) | |
|     lastSigScanPosSb = n | |
|     firstSigScanPosSb = n | |
|   } | |
|   if( sh_dep_quant_used_flag ) | |
|     QState = QStateTransTable[ QState ][ AbsLevel[ xC ][ yC ] & 1 ] | |
| } | |
| signHiddenFlag = sh_sign_data_hiding_used_flag && | |
|   ( lastSigScanPosSb − firstSigScanPosSb > 3 ? 1 : 0 ) | |
| numPredSigns = 0 | |
| for( n = numSbCoeff − 1; n >= 0; n− − ) { | |
|   xC = ( xS << log2SbW ) + DiagScanOrder[ log2SbW ][ log2SbH ][ n ][ 0 ] | |
|   yC = ( yS << log2SbH ) + DiagScanOrder[ log2SbW ][ log2SbH ][ n ][ 1 ] | |
|   if( ( AbsLevel[ xC ][ yC ] > 0 ) && | |
|     ( !signHiddenFlag \|\| ( n != firstSigScanPosSb ) ) ) { | |
|     if( !isSignPredicted \|\| numPredSigns >= maxNumPredSigns ) { | |
|       coeff_sign_flag[ n ] | ae(v) |
|     } else { | |
|       coeff_sign_resi_flag[ n ] | ae(v) |
|       numPredSigns++ | |
|     } | |
|   } | |
| } | |
| if( sh_dep_quant_used_flag ) { | |
|   QState = startQStateSb | |
|   for( n = numSbCoeff − 1; n >= 0; n− − ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( AbsLevel[ xC ][ yC ] > 0 ) | |
|       TransCoeffLevel[ x0 ][ y0 ][ cIdx ][ xC ][ yC ] = | |
|         ( 2 * AbsLevel[ xC ][ yC ] − ( QState > 1 ? 1 : 0 ) ) * | |
|         ( 1 − 2 * coeff_sign_flag[ n ] ) | |
|     QState = QStateTransTable[ QState ][ AbsLevel[ xC ][ yC ] & 1 ] | |
|   } | |
| } else { | |
|   sumAbsLevel = 0 | |
|   for( n = numSbCoeff − 1; n >= 0; n− − ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( AbsLevel[ xC ][ yC ] > 0 ) { | |
|       TransCoeffLevel[ x0 ][ y0 ][ cIdx ][ xC ][ yC ] = | |
|         AbsLevel[ xC ][ yC ] * ( 1 − 2 * coeff_sign_flag[ n ] ) | |
|       if( signHiddenFlag ) { | |
|         sumAbsLevel += AbsLevel[ xC ][ yC ] | |
|         if( n = = firstSigScanPosSb && sumAbsLevel % 2 = = 1 ) | |
|           TransCoeffLevel[ x0 ][ y0 ][ cIdx ][ xC ][ yC ] = | |
|             −TransCoeffLevel[ x0 ][ y0 ][ cIdx ][ xC ][ yC ] | |
|       } | |
|     } | |
|   } | |
| } | |
| } | |

FIG. 9

| residual_ts_coding( x0, y0, log2TbWidth, log2TbHeight, cIdx ) { | Descriptor |
|---|---|
| ... | |
|   for( i =0; i <= lastSubBlock; i++ ) { | |
|     xS = DiagScanOrder[ log2TbWidth − log2SbW ][ log2TbHeight − log2SbH ][ i ][ 0 ] | |
|     yS = DiagScanOrder[ log2TbWidth − log2SbW ][ log2TbHeight − log2SbH ][ i ][ 1 ] | |
|     if( i != lastSubBlock  \|\|  !inferSbCbf ) | |
|       sb_coded_flag[ xS ][ yS ] | ae(v) |
| ... | |
|     /* First scan pass */ | |
|     inferSbSigCoeffFlag = 1 | |
|     lastScanPosPass1 = −1 | |
|     for( n = 0; n <= numSbCoeff − 1 && RemCcbs >= 4; n++ ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       lastScanPosPass1 = n | |
|       if( sb_coded_flag[ xS ][ yS ] && <br>         ( n != numSbCoeff − 1  \|\|  !inferSbSigCoeffFlag ) ) { | |
|         sig_coeff_flag[ xC ][ yC ] | ae(v) |
|         RemCcbs− − | |
|         if( sig_coeff_flag[ xC ][ yC ] ) | |
|           inferSbSigCoeffFlag = 0 | |
|       } | |
|       CoeffSignLevel[ xC ][ yC ] = 0 | |
|       if( sig_coeff_flag[ xC ][ yC ] ) { | |
|         coeff_sign_flag[ n ] | ae(v) |
|         RemCcbs− − | |
|         CoeffSignLevel[ xC ][ yC ] = ( coeff_sign_flag[ n ] > 0 ? −1 : 1 ) | |
|         abs_level_gtx_flag[ n ][ 0 ] | ae(v) |
|         RemCcbs− − | |
|         if( abs_level_gtx_flag[ n ][ 0 ] ) { | |
|           par_level_flag[ n ] | ae(v) |
|           RemCcbs− − | |
|         } | |
|       } | |
|       AbsLevelPass1[ xC ][ yC ] = <br>         sig_coeff_flag[ xC ][ yC ] + par_level_flag[ n ] + abs_level_gtx_flag[ n ][ 0 ] | |
|     } | |
|     /* Greater than X scan pass (numGtXFlags=5) */ | |
|     lastScanPosPass2 = −1 | |
|     for( n = 0; n <= numSbCoeff − 1 && RemCcbs >= 4; n++ ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       AbsLevelPass2[ xC ][ yC ] = AbsLevelPass1[ xC ][ yC ] | |

FIG. 10

| | |
|---|---|
|     for( j = 1; j < 5; j++ ) { | |
|       if( abs_level_gtx_flag[ n ][ j − 1 ] ) { | |
|         abs_level_gtx_flag[ n ][ j ] | ae(v) |
|         RemCcbs− − | |
|       } | |
|       AbsLevelPass2[ xC ][ yC ] += 2 * abs_level_gtx_flag[ n ][ j ] | |
|     } | |
|     lastScanPosPass2 = n | |
|   } | |
| /* remainder scan pass */ | |
|   for( n = 0; n <= numSbCoeff − 1; n++ ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( ( n <= lastScanPosPass2 && AbsLevelPass2[ xC ][ yC ] >= 10 ) \|\|<br>      ( n > lastScanPosPass2 && n <= lastScanPosPass1 &&<br>      AbsLevelPass1[ xC ][ yC ] >= 2 ) \|\|<br>      ( n > lastScanPosPass1 && sb_coded_flag[ xS ][ yS ] ) ) | |
|     abs_remainder[ n ] | ae(v) |
|     if( n <= lastScanPosPass2 ) | |
|       AbsLevel[ xC ][ yC ] = AbsLevelPass2[ xC ][ yC ] + 2 * abs_remainder[ n ] | |
|     else if(n <= lastScanPosPass1 ) | |
|       AbsLevel[ xC ][ yC ] = AbsLevelPass1[ xC ][ yC ] + 2 * abs_remainder[ n ] | |
|     else { /* bypass */ | |
|       AbsLevel[ xC ][ yC ] = abs_remainder[ n ] | |
|       if( abs_remainder[ n ] ) | |
|         coeff_sign_flag[ n ] | ae(v) |
|     } | |
|     if( BdpcmFlag[ x0 ][ y0 ][ cIdx ] == 0 && n <= lastScanPosPass1 ) { | |
|       absLeftCoeff = xC > 0 ? AbsLevel[ xC − 1 ][ yC ] : 0 | |
|       absAboveCoeff = yC > 0 ? AbsLevel[ xC ][ yC − 1 ] : 0 | |
|       predCoeff = Max( absLeftCoeff, absAboveCoeff ) | |
|       if( AbsLevel[ xC ][ yC ] == 1 && predCoeff > 0 ) | |
|         AbsLevel[ xC ][ yC ] = predCoeff | |
|       else if( AbsLevel[ xC ][ yC ] > 0 && AbsLevel[ xC ][ yC ] <= predCoeff ) | |
|         AbsLevel[ xC ][ yC ]− − | |
|     } | |
|     TransCoeffLevel[ x0 ][ y0 ][ cIdx ][ xC ][ yC ] = ( 1 − 2 * coeff_sign_flag[ n ] ) *<br>      AbsLevel[ xC ][ yC ] | |
|   } | |
|   } | |
| } | |

| | |
|---|---|
| ... | |
| signHiddenFlag = sh_sign_data_hiding_used_flag && <br> ( lastSigScanPosSb − firstSigScanPosSb > 3 ? 1 : 0 ) | |
| if( !isSignPredictedSubTU ) | |
|   for( n = numSbCoeff − 1; n >= 0; n− − ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( ( AbsLevel[ xC ][ yC ] > 0 ) && <br>     ( !signHiddenFlag \|\| ( n != firstSigScanPosSb ) ) ) | |
|       coeff_sign_flag[ n ] | ae(v) |
|   } | |
| } | |
| if( sh_dep_quant_used_flag ) { | |
| ... | |
|   if( signHiddenFlag ) { | |
|     signHiddenCoeff[ x0 ][ y0 ][ cIdx ][ xC ][ yC ] = 1 | |
|     sumAbsLevel += AbsLevel[ xC ][ yC ] | |
| ... | |
| } | |

(b)

| | Descriptor |
|---|---|
| coding_unit( x0, y0, cbWidth, cbHeight, cqtDepth, treeType, modeType ) { | |
| ... | |
|   mts_idx | |
| } | |
| for( i=0; i < NumTUs; i++ ) | |
|   for( cIdx = 0; cIdx < 3; cIdx++ ) | |
|     if( isSignPredictedTU ) | |
|       sign_prediction( x, y, tbWidth, tbHeight, cIdx ) | |
| } | |
| } | |

(c)

| | Descriptor |
|---|---|
| sign_prediction( x0, y0, tbWidth, tbHeight, cIdx ) { | |
| spAreaWidth = Min( tbWidth, spRange ) | |
| spAreaHeight = Min( tbHeight, spRange ) | |
| numPredSigns = 0 | |
| for( y=0; y<spAreaHeight; y++ ){ | |
|   for( x=0; x<spAreaWidth; x++ ){ | |
|     n = y * spAreaWidth + x | |
|     if( AbsLevel[ x ][ y ] > 0 && !signHiddenCoeff[ x0 ][ y0 ][ cIdx ][ x ][ y ] ) { | |
|       if( !isSignPredicted \|\| numPredSigns >= maxNumPredSigns ) { | |
|         coeff_sign_flag[ n ] | ae(v) |
|       } else { | |
|         coeff_sign_resi_flag[ n ] | ae(v) |
|         numPredSigns++ | |
|       } | |
|     } | |
|   } | |
| } | |

FIG. 12

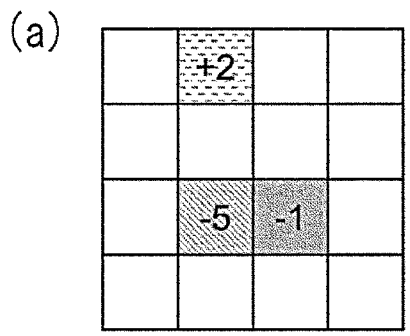
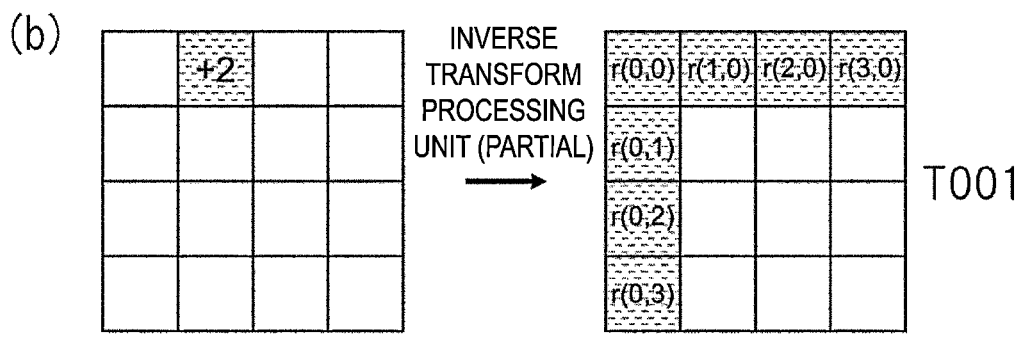
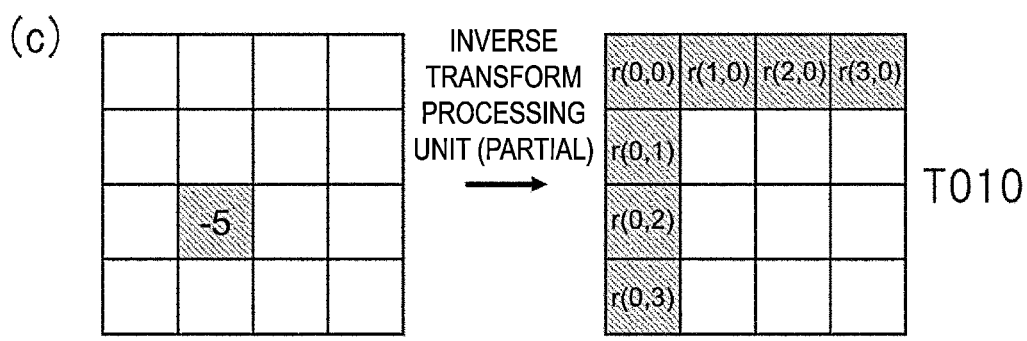
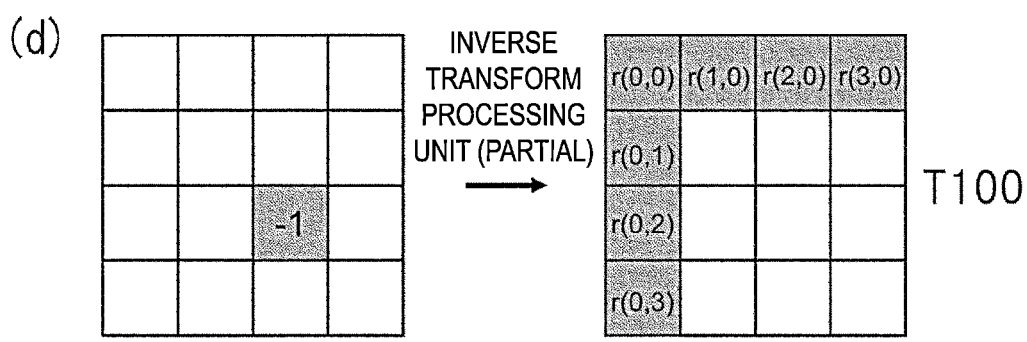
FIG. 14

| R(0,-2) | R(1,-2) | R(2,-2) | R(3,-2) |
|---|---|---|---|
| R(0,-1) | R(1,-1) | R(2,-1) | R(3,-1) |

| | | | | | |
|---|---|---|---|---|---|
| R(-2,0) | R(-1,0) | R'(0,0) | R'(1,0) | R'(2,0) | R'(3,0) |
| R(-2,1) | R(-1,1) | R'(0,1) | | | |
| R(-2,2) | R(-1,2) | R'(0,2) | | | |
| R(-2,3) | R(-1,3) | R'(0,3) | | | |

| seq_parameter_set_rbsp( ) { | Descriptor |
|---|---|
| ... | |
| sps_lfnst_enabled_flag | u(1) |
| ... | |
| if( !sps_lfnst_enabled_flag ) | |
|    sps_sign_prediction_enabled_flag | u(1) |
| if( sps_sign_prediction_enabled_flag ) | |
|    sps_num_pred_signs | u(3) |
| ... | |
| } | |

(b)

| seq_parameter_set_rbsp( ) { | Descriptor |
|---|---|
| ... | |
| sps_sign_prediction_enabled_flag | u(1) |
| if( sps_sign_prediction_enabled_flag ) | |
|    sps_num_pred_signs | u(3) |
| ... | |
| if( !sps_sign_prediction_enabled_flag ) | |
|    sps_lfnst_enabled_flag | u(1) |
| ... | |
| } | |

(c)

| seq_parameter_set_rbsp( ) { | Descriptor |
|---|---|
| ... | |
| sps_explicit_scaling_list_enabled_flag | u(1) |
| if( sps_lfnst_enabled_flag && sps_explicit_scaling_list_enabled_flag ) | |
|    sps_scaling_matrix_for_lfnst_disabled_flag | u(1) |
| ... | |
| if( !sps_explicit_scaling_list_enabled_flag ) | |
|    sps_sign_prediction_enabled_flag | u(1) |
| if( sps_sign_prediction_enabled_flag ) | |
|    sps_num_pred_signs | u(3) |
| ... | |
| } | |

(d)

| seq_parameter_set_rbsp( ) { | Descriptor |
|---|---|
| ... | |
| sps_sign_prediction_enabled_flag | u(1) |
| if( sps_sign_prediction_enabled_flag ) | |
|    sps_num_pred_signs | u(3) |
| ... | |
| if( !sps_sign_prediction_enabled_flag ) | u(1) |
|    sps_explicit_scaling_list_enabled_flag | u(1) |
| if( sps_lfnst_enabled_flag && sps_explicit_scaling_list_enabled_flag ) | |
|    sps_scaling_matrix_for_lfnst_disabled_flag | u(1) |
| ... | |
| } | |

FIG. 17

VIDEO DECODING APPARATUS AND VIDEO CODING APPARATUS

TECHNICAL FIELD

An embodiment of the present invention relates to a video decoding apparatus and a video coding apparatus.

BACKGROUND ART

A video coding apparatus which generates coded data by coding a video, and a video decoding apparatus which generates decoded images by decoding coded data are used for efficient transmission or recording of videos.

Specific video coding schemes include, for example, H.264/AVC and High-Efficiency Video Coding (HEVC), and the like.

In such a video coding scheme, images (pictures) constituting a video are managed in a hierarchical structure including slices obtained by splitting an image, Coding Tree Units (CTUs) obtained by splitting a slice, Coding Units (CUs) obtained by splitting a coding tree unit, and Transform Units (TUs) obtained by splitting a coding unit, and are coded/decoded for each CU.

In such a video coding scheme, usually, a prediction image is generated based on a locally decoded image that is obtained by coding/decoding an input image, and a prediction error (which may be referred to also as a "difference image" or a "residual image") obtained by subtracting the prediction image from the input image (source image) is coded. Generation methods of prediction images include inter picture prediction (inter prediction) and intra picture prediction (intra prediction).

In HEVC/H.265 and VVC/H.266, a technique of coding a sign for each transform coefficient is disclosed. In NPL 1, a technique referred to as Sign Prediction is disclosed, in which signs of transform coefficients are predicted and a prediction sign error is coded. In NPL 2, techniques for performing transform coefficient sort for selecting a transform coefficient as a target to be subjected to sign prediction, block size restriction for performing sign prediction, and sign prediction in non-separable transform are disclosed.

CITATION LIST

Non Patent Literature

NPL 1: "Residual Coefficient Sign Prediction", JVET-D0031, Joint Video Exploration Team (JVET) of ITU-T SG 16 WP 3 and ISO/IEC JTC 1/SC 29/WG 11, 4th Meeting, Chengdu, CN NPL 2: "EE2-4.3 related: More combined test results for sign prediction", JVET-Y0141, Joint Video Experts Team (JVET) of ITU-T SG 16 WP 3 and ISO/IEC JTC 1/SC 29, 25th Meeting, by teleconference

SUMMARY OF INVENTION

Technical Problem

In the methods described in NPL 1 and NPL 2, as the number of signs to be predicted increases, combinations thereof increase exponentially, and thus there is a problem in that the amount of calculation increases. Due to the sign prediction being added to quantization and transform processing, there is a problem in that the number of cycles required until deriving residuals increases.

Solution to Problem

In order to solve the problems described above, a video decoding apparatus according to an aspect of the present invention includes a parameter decoder configured to decode a transform coefficient and a coefficient sign prediction error from coded data, and a sign prediction unit configured to predict a sign of the transform coefficient, wherein the sign prediction unit derives a cost with reference to a boundary pixel with a neighboring block for a candidate of a combination of signs of transform coefficients without sign information, and selects the sign, based on the cost, and modifies the predicted transform coefficient sign, using the coefficient sign prediction error decoded by the parameter decoder, and the sign prediction unit divides the transform coefficients without the sign information into multiple groups, and performs the prediction on a transform coefficient of the transform coefficients for each of the multiple groups.

A video decoding apparatus according to another aspect of the present invention includes a parameter decoder configured to decode multiple parameters from coded data, and a prediction unit configured to perform prediction on a sign of a transform coefficient, wherein the parameter decoder decodes a parameter (sps_lfnst_enabled_flag) indicating whether to use non-separable transform, and in a case that the non-separable transform is not used, the parameter decoder decodes a parameter (sps_sign_prediction_enabled_flag) indicating whether to apply sign prediction.

A video decoding apparatus according to another aspect of the present invention includes a parameter decoder configured to decode multiple parameters from coded data, and a prediction unit configured to perform prediction on a sign of a transform coefficient, wherein the parameter decoder decodes a parameter (sps_explicit_scaling_list_enabled_flag) indicating whether to use a scaling matrix, and in a case that the scaling matrix is not used, the parameter decoder decodes a parameter (sps_sign_prediction_enabled_flag) indicating whether to use sign prediction.

Advantageous Effects of Invention

According to an aspect of the present invention, the amount of calculation required for prediction of a sign of a transform coefficient can be reduced in video coding/decoding processing. In the video coding/decoding processing, the number of cycles required until deriving residuals can be reduced.

BRIEF DESCRIPTION OF DRAWINGS

FIG. 7 is an example of a syntax table related to sign prediction in an SPS and a slice header.

FIG. 8 is a part of a syntax table related to an RRC unit.

FIG. 9 is a part of a syntax table related to the RRC unit.

FIG. 10 is a part of a syntax table related to a TSRC unit.

FIG. 11 is a part of a syntax table related to the TSRC unit.

FIG. 12 is an example of another syntax table related to the sign prediction.

FIG. 14 is a diagram illustrating the sign prediction. (a) is a diagram illustrating an example of coefficients as a prediction target, and (b) to (d) are diagrams illustrating templates different from each other.

FIG. 15 is a diagram illustrating boundary part residuals and pixels around the boundary part residuals in the sign prediction.

FIG. 17 is an example of a syntax table in an embodiment for exclusively performing non-separable transform and a scaling matrix in the sign prediction.

DESCRIPTION OF EMBODIMENTS

First Embodiment

Embodiments of the present invention will be described below with reference to the drawings.

Figure 1:
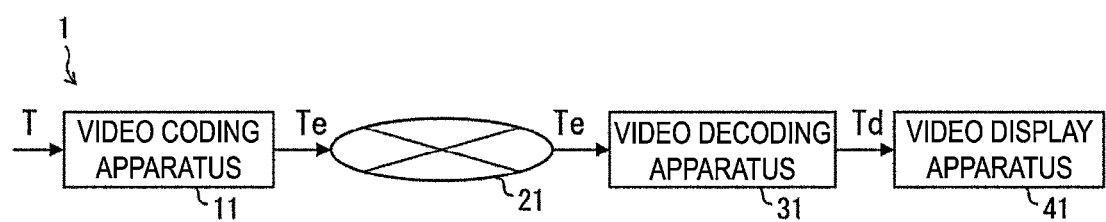
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not limited to a bidirectional communication network and may be a unidirectional communication network that transmits broadcast waves for terrestrial digital broadcasting, satellite broadcasting, or the like. The network 21 may be substituted by a storage medium in which the coding stream Te is recorded, such as a Digital Versatile Disc (DVD) (trade name) or a Blue-ray Disc (BD) (trade name).

The video decoding apparatus 31 decodes each of the coding streams Te transmitted from the network 21 and generates one or multiple decoded images Td.

The video display apparatus 41 displays all or part of one or multiple decoded images Td generated by the video decoding apparatus 31. For example, the video display apparatus 41 includes a display device such as a liquid crystal display and an organic Electro-luminescence (EL) display. Examples of display types include stationary, mobile, and HMD. In addition, in a case that the video decoding apparatus 31 has a high processing capability, an image having high image quality is displayed, and in a case that the video decoding apparatus has a lower processing capability, an image which does not require high processing capability and display capability is displayed.

Operators

Operators used in the present specification will be described below.

">>" is a right bit shift, "<<" is a left bit shift, "&" is a bitwise AND, "|" is a bitwise OR, "|=" is an OR assignment operator, and "||" indicates a logical sum.

x?y:z is a ternary operator that takes y in a case that x is true (other than 0) and takes z in a case that x is false(0).

Clip3(a, b, c) is a function to clip c in a value from a to b, and a function to return a in a case that c is smaller than a (c<a), return b in a case that c is greater than b (c>b), and return c in the other cases (provided that a is smaller than or equal to b (a<=b)).

abs(a) is a function that returns the absolute value of a.

Int(a) is a function that returns the integer value of a.

floor(a) is a function that returns the maximum integer equal to or smaller than a.

ceil(a) is a function that returns the minimum integer equal to or greater than a.

a/d represents division of a by d (round down decimal places).

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 2:
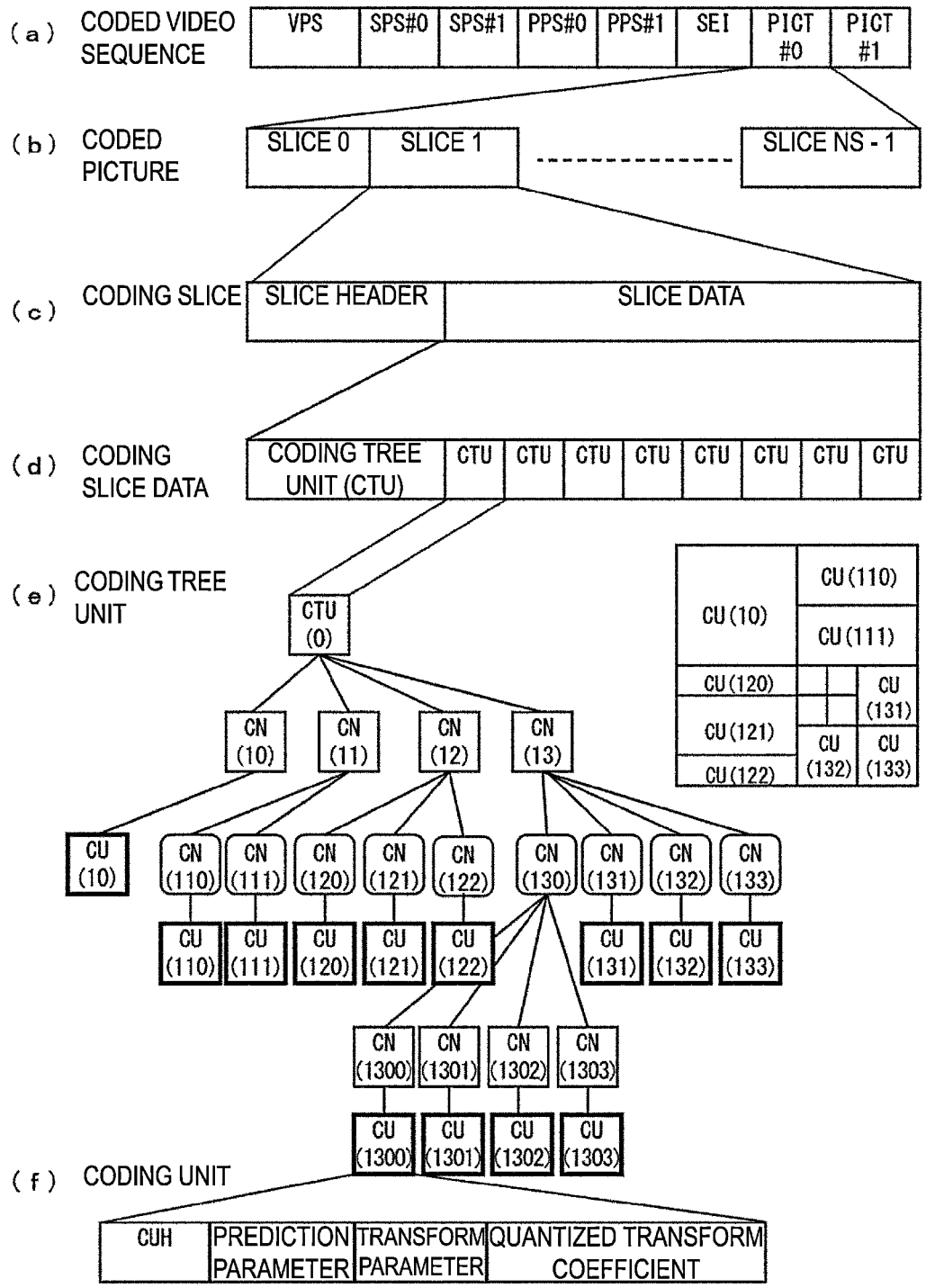
FIG. 2 is a diagram illustrating a hierarchical structure of data of a coding stream.

FIG. 2 is a diagram illustrating a hierarchical structure of data of the coding stream Te. The coding stream Te includes, as an example, a sequence and multiple pictures constituting the sequence. (a) to (f) of FIG. 2 are diagrams illustrating a coded video sequence predefining a sequence SEQ, a coded picture defining a picture PICT, a coding slice defining a slice S, a coding slice data defining slice data, a coding tree unit included in the coding slice data, and a coding unit included in the coding tree unit, respectively.

Coded Video Sequence

In the coded video sequence, a set of data referred to by the video decoding apparatus 31 to decode a sequence SEQ to be processed is defined. As illustrated in FIG. 2, the sequence SEQ includes a Video Parameter Set, Sequence Parameter Sets SPS, Picture Parameter Sets PPS, an Adaptation Parameter Set (APS), a picture PICT, and Supplemental Enhancement Information SEI.

The video parameter set VPS defines, in a video including multiple layers, a set of coding parameters common to multiple video images and a set of coding parameters relating to multiple layers and individual layers included in the video.

In the sequence parameter sets SPSs, a set of coding parameters referred to by the video decoding apparatus 31 to decode a target sequence is defined. For example, a width and a height of a picture are defined. Note that multiple SPSs may exist. In that case, any of the multiple SPSs is selected from the PPS.

In the picture parameter sets (PPS), a set of coding parameters that the video decoding apparatus 31 refers to in order to decode each picture in the target sequence is defined. For example, a PPS includes a reference value for a quantization step size used in picture decoding (pic_init_qp_minus26) and a flag indicating application of weighted prediction (weighted_pred_flag). Note that multiple PPSs may exist. In that case, any of the multiple PPSs is selected from each picture in a target sequence.

Coded Picture

In the coded picture, a set of data referred to by the video decoding apparatus 31 to decode a picture PICT to be processed is defined. The picture PICT includes slice 0 to slice NS-1 (NS is the total number of slices included in the picture PICT) as illustrated in FIG. 2.

Note that, in a case that it is not necessary to distinguish each of the slice 0 to the slice NS-1 below, numeric suffixes of reference signs may be omitted. In addition, the same applies to other data with suffixes included in the coding stream Te which will be described below.

Coding Slice

In each coding slice, a set of data referred to by the video decoding apparatus 31 to decode a slice S to be processed is defined. The slice includes a slice header and slice data as illustrated in FIG. 2.

The slice header includes a coding parameter group referred to by the video decoding apparatus 31 to determine a decoding method for a target slice. Slice type indication information (slice_type) indicating a slice type is one example of a coding parameter included in the slice header.

Examples of slice types that can be indicated by the slice type indication information include (1) an I slice for which only intra prediction is used for coding, (2) a P slice for which unidirectional prediction or intra prediction is used for coding, (3) a B slice for which unidirectional prediction, bidirectional prediction, or intra prediction is used for coding. Note that the inter prediction is not limited to uni-prediction and bi-prediction, and a prediction image may be generated by using a larger number of reference pictures. Hereinafter, in a case of a slice being referred to as a P or B slice, it indicates a slice including a block in which inter prediction can be used.

Note that the slice header may include a reference to the picture parameter set PPS (pic_parameter_set_id).

Coding Slice Data

In coding slice data, a set of data referred to by the video decoding apparatus 31 to decode slice data to be processed is defined. The slice data includes CTUs as illustrated in FIG. 2(d). A CTU is a block in a fixed size (for example, 64×64) constituting a slice, and may also be called a Largest Coding Unit (LCU).

Coding Tree Unit

In FIG. 2, a set of data referenced by the video decoding apparatus 31 to decode a CTU to be processed is defined. The CTU is split into coding units CUs, each of which is a basic unit of coding processing, by a recursive Quad Tree (QT) split, Binary Tree (BT) split, or Ternary Tree (TT) split. The BT split and the TT split are collectively referred to as Multi Tree (MT) split. A node of a tree structure obtained by the recursive quad tree split is referred to as a Coding Node. An intermediate node of a quad tree, a binary tree, and a ternary tree is a coding node, and a CTU itself is also defined as the highest coding node. The lowest coding node is defined as the coding unit.

Different trees may be used between luminance (first color component, cIdx=0) and chrominance (second and third color components, cIdx=1, 2). The type of the tree is represented by treeType. For example, in a case that a common tree is used for luminance and chrominance, a common single tree is represented by treeType=SINGLE_TREE. In a case that two different trees (dual tree) are used between luminance (Y, cIdx=0) and chrominance (Cb/Cr, cIdx=1, 2), the tree of luminance is represented by treeType=DUAL_TREE_LUMA, and the tree of chrominance is represented by treeType=DUAL_TREE_CHROMA. In a case of DUAL_TREE_CHROMA, only a chroma image is coded and decoded, and is hence also simply referred to as a chroma tree.

Coding Unit

In FIG. 2, a set of data referenced by the video decoding apparatus 31 to decode a coding unit to be processed is defined. Specifically, a CU includes a CU header CUH, a prediction parameter, a transform parameter, a quantized transform coefficient, and the like. In the CU header, a prediction mode and the like are defined.

The prediction processing may be performed for each CU or performed for each sub-CU, the sub-CU being obtained by further splitting the CU. In a case that a CU and a sub-CU have an equal size, the number of sub-CUs in the CU is one. In a case that a CU has a size larger than that of a sub-CU, the CU is split into sub-CUs. For example, in a case that a CU has a size of 8×8, and a sub-CU has a size of 4×4, the CU is split into four sub-CUs which include two horizontal splits and two vertical splits.

Types of prediction (prediction mode) include intra prediction (MODE_INTRA), inter prediction (MODE_INTER), and an intra block copy (MODE_IBC). Intra prediction refers to prediction in the same picture, and inter prediction refers to prediction processing performed between different pictures (for example, between pictures of different display times, and between pictures of different layer images).

Although transform and quantization processing is performed for each CU, entropy coding of a quantized transform coefficient may be performed for each subblock such as 4×4.

Prediction Parameters

A prediction image is derived by prediction parameters associated with blocks. The prediction parameters include intra prediction and inter prediction parameters.

Prediction Parameters for Inter Prediction

The prediction parameters for inter prediction will be described. Inter prediction parameters include prediction list utilization flags predFlagL0 and predFlagL1, reference picture indices refIdxL0 and refIdxL1, and motion vectors mvL0 and mvL1. predFlagL0 and predFlagL1 are flags indicating whether reference picture lists (L0 list and L1 list) are used, and in a case that the value of each of the flags is 1, a corresponding reference picture list is used. Note that, in a case that the present specification mentions "a flag indicating whether XX is applied", the flag indicating a value other than 0 (for example, 1) means a case where XX is applied, and the flag indicating 0 means a case where XX is not applied, and 1 is treated as true and 0 is treated as false in a logical negation, a logical product, and the like (hereinafter, the same applies). However, other values can be used for true values and false values in real apparatuses and methods.

Syntax elements for deriving the inter prediction parameters include, for example, a merge flag merge_flag (general_merge_flag), a merge index merge_idx, merge_subblock_flag indicating whether to use inter prediction in units of subblock, regulare_merge_flag, ciip_flag indicating whether to use a combined inter-picture merge and intra-picture prediction (CIIP) mode or use a Geometric partitioning merge mode (GPM mode), merge_gpm_partition_idx indicating a split shape of the GPM mode, merge_gpm_idx0 and merge_gpm_idx1 indicating the merge indexes of the GPM mode, an inter prediction indicator inter_pred_idc for selecting a reference picture to be used in an AMVP mode, a reference picture index refIdxLX, a prediction vector index mvp_LX_idx for deriving a motion vector, a difference vector mvdLX, and a motion vector resolution mode amvr_mode.

Reference Picture List

A reference picture list is a list including reference pictures stored in a reference picture memory 306. For individual CUs, which picture in a reference picture list RefPicListX (X=0 or 1) is actually referred to is indicated with refIdxLX. Note that LX is a description method used in a case of not distinguishing L0 prediction and L1 prediction, and in the following description, distinguishes parameters for the L0 list and parameters for the L1 list by replacing LX with L0 and L1.

Merge Prediction and AMVP Prediction

A decoding (coding) method for prediction parameters includes a merge prediction (merge) mode (merge mode) and an Advanced Motion Vector Prediction (AMVP) mode, and merge_flag is a flag for identifying the modes. The merge mode is a prediction mode in which some or all of motion vector differences are omitted, and a mode in which a prediction list utilization flag predFlagLX, reference picture index refIdxLX, and a motion vector mvLX are derived from prediction parameters for neighboring blocks already processed, or the like, without being included in coded data. The AMVP mode is a mode in which inter_pred_idc, refIdxLX, and mvLX are included in the coded data. Note that mvLX is coded as mvp_LX_idx identifying a prediction vector mvpLX and a difference vector mvdLX. In addition, the prediction mode in which the motion vector difference is omitted or simplified is collectively called a general merge mode, and the general merge mode and the AMVP prediction may be selected by general_merge_flag.

Furthermore, in a case that regular_merge_flag is transmitted, and regular_merge_flag is 1, the normal merge mode or the MMVD may be selected, and otherwise the CIIP mode or the GPM mode may be selected. In the CIIP mode, a prediction image is generated using a weighted sum of an inter prediction image and an intra prediction image. In the GPM mode, a prediction image is generated as two non-rectangular prediction units obtained by splitting a target CU along a line segment.

inter_pred_idc is a value indicating the types and number of reference pictures, and takes any value of PRED_L0, PRED_L1, or PRED_BI. PRED_L0 and PRED_L1 indicate uni-prediction which uses one reference picture managed in the L0 list and one reference picture managed in the L1 list, respectively. PRED_BI indicates bi-prediction which uses two reference pictures managed in the L0 list and the L1 list.

merge_idx is an index indicating which prediction parameter is used as a prediction parameter for a target block, among prediction parameter candidates (merge candidates) derived from process-completed blocks.

Motion Vector mvLX indicates a shift amount between blocks in two different pictures. A prediction vector and a difference vector related to mvLX are referred to as mvpLX and mvdLX, respectively.

Inter Prediction Indicator inter_pred_idc and Prediction List Utilization Flag predFlagLX Relationships between inter_pred_idc and predFlagL0 and predFlagL1 are as follows, and can be transformed into one another.

$$\text{inter\_pred\_idc} = (predFlagL1 \ll 1) + predFlagL0$$

$$predFlagL0 = \text{inter\_pred\_idc} \,\&\, 1$$

$$predFlagL1 = \text{inter\_pred\_idc} \gg 1$$

Note that the inter prediction parameters may use a prediction list utilization flag or may use an inter prediction indicator. In addition, determination using a prediction list utilization flag may be replaced with determination using an inter prediction indicator. On the contrary, determination using an inter prediction indicator may be replaced with determination using a prediction list utilization flag.

Determination of Bi-Prediction biPred

A flag biPred for identifying a bi-prediction can be derived from whether two prediction list utilization flags are both 1.

Alternatively, biPred can be also derived from whether the inter prediction indicator is a value indicating the use of two prediction lists (reference pictures).

Configuration of Video Decoding Apparatus

Figure 3:
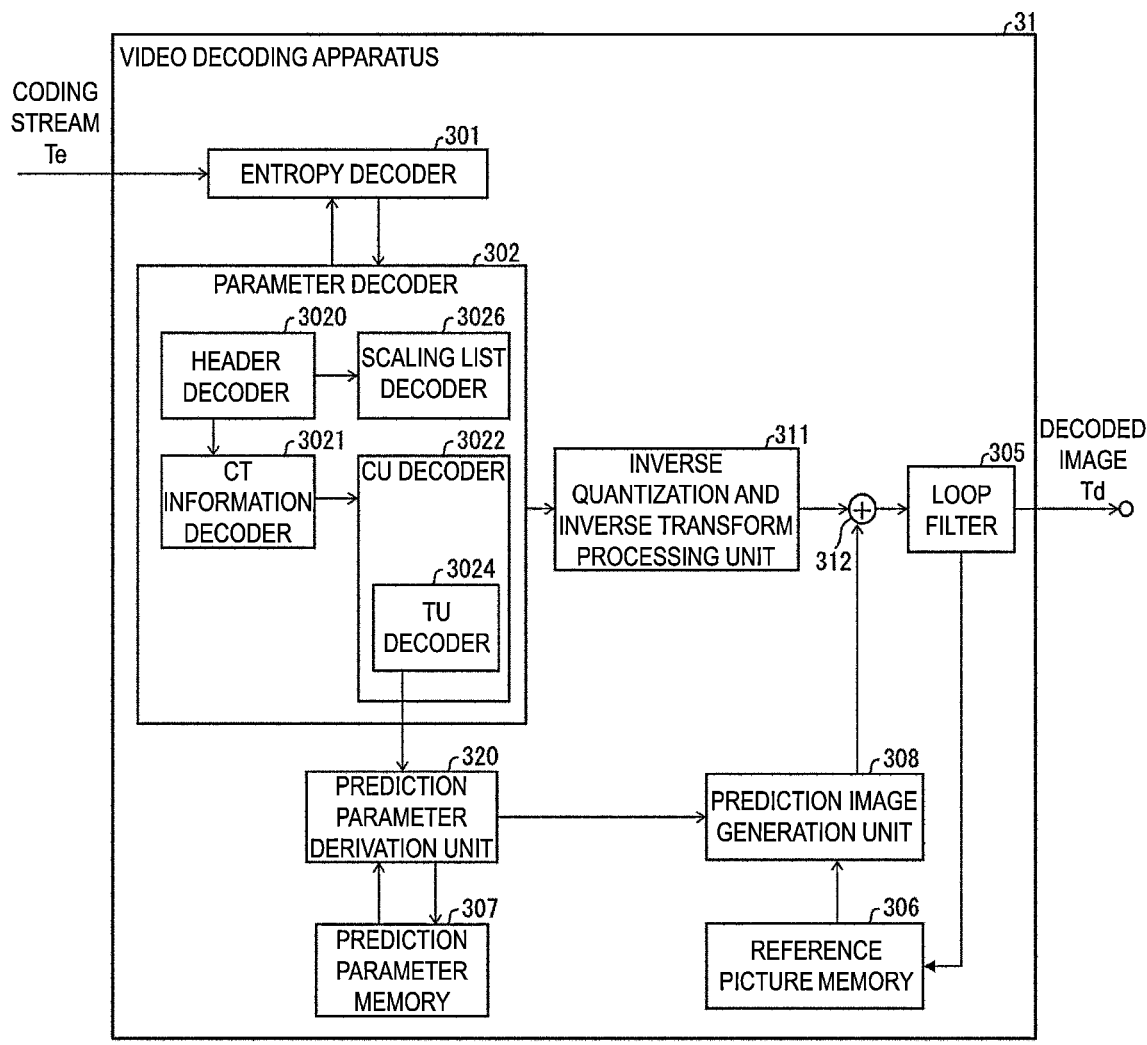
FIG. 3 is a schematic diagram illustrating a configuration of a video decoding apparatus.

A configuration of the video decoding apparatus 31 (FIG. 3) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that a configuration in which the loop filter 305 is not included in the video decoding apparatus 31 may be used in accordance with the video coding apparatus 11 described below.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as a VPS, an SPS, a PPS, and an APS, and a slice header (slice information). The CT information decoder 3021 decodes a CT from coded data. The CU decoder 3022 decodes a CU from coded data.

The CU decoder 3022 decodes, from the coded data, a parameter lfnst_idx indicating whether a non-separable transform is used and a non-separable transform matrix. Specifically, in a case that the width and the height of the CU are equal to or greater than 4 and the prediction mode is the intra prediction mode, the CU decoder 3022 decodes lfnst_idx. Note that lfnst_idx being 0 indicates no application of the non-separable transform, lfnst_idx being 1 indicates one transform matrix of a set (pair) of non-separable transform matrices, and lfnst_idx being 2 indicates the other transform matrix of the pair. The CU decoder 3022 derives a parameter ApplyLfnstFlag indicating whether to perform the non-separable transform on the target block from lfnst_idx.

ApplyLfnstFlag=lfnst_idx

ApplyLfnstFlag[cIdx] may be derived for each color component cIdx as follows.

In a case that treeType==SINGLE_TREE or DUAL_TREE_LUMA, the CU decoder 3022 performs the following processing.

$$ApplyLfnstFlag[0] = (lfnst\_idx > 0)?1: 0$$

Then, the CU decoder 3022 performs the following processing on cIdx=1, 2.

$$ApplyLfnstFlag[cIdx] =$$
$$(lfnst\_idx > 0 \;\&\&\; treeType == DUAL\_TREE\_CHROMA)?1: 0$$

lfnst_idx may be 0 or 1. lfnst_idx may be derived from a mode number of the intra prediction.

The CU decoder 3022 decodes a value mts_idx indicating a transform matrix of Multiple Transform Selection (MTS) from the coded data. Specifically, in a case that the width and the height of the CU are equal to or greater than 32 and lfnst_idx is 0, the CU decoder 3022 decodes mts_idx. In MTS, one transform matrix is selected out of multiple transform matrix candidates and is used.

The CU decoder 3022 may decode an intra template matching prediction flag intra_tmpl_flag from the coded data. In a case that intra_tmpl_flag is 1, it is indicated that intra template matching prediction is performed. The intra template matching prediction is a mode in which, with left and top neighboring pixels being templates, a block most similar to the templates is copied from decoded blocks.

In a case that a size of the transform unit (tbWidth and tbHeight) is equal to or smaller than a prescribed maximum size (tbWidth<=MaxTsSize && tbHeight<=MaxTsSize), the TU decoder 3024 decodes transform_skip_flag[x0][y0][cIdx].

In a case that the TU includes a prediction error (for example, in a case that tu_cbf_luma[x0][y0] is 1), the TU decoder 3024 decodes, from the coded data, the QP update information and the quantized transform coefficient. Derivation of the quantized transform coefficient may involve multiple modes (for example, an RRC mode and a TSRC mode).

Regular Residual Coding (RRC) is a decoding mode of a prediction error using transform, and Transform Skip Residual Coding (TSRC) is a decoding mode of a prediction error in a transform skip mode in which transform is not performed. In the RRC mode, the TU decoder 3024 may decode a LAST position of the transform coefficient, and in the TSRC mode, the TU decoder 3024 need not decode the LAST position. The QP update information is a difference value from a quantization parameter prediction value qPpred, which is a prediction value of a quantization parameter QP.

The prediction image generation unit 308 includes an inter prediction image generation unit 309 and an intra prediction image generation unit 310.

The prediction parameter derivation unit 320 includes an inter prediction parameter derivation unit 303 and an intra prediction parameter derivation unit.

In addition, although an example in which CTU and CU are used as a unit of processing will be described below, the unit of processing is not limited to this example, and processing may be performed for each sub-CU. Alternatively, the CTU or the CU may be referred to as a block, the sub-CU may be referred to as a subblock, and processing may be performed for each block or subblock.

The entropy decoder 301 performs entropy decoding on the coding stream Te input from the outside and decodes individual codes (syntax elements). The entropy coding includes a method in which variable-length coding of syntax elements is performed by using a context (probability model) adaptively selected according to a type of syntax element and a surrounding condition, and a method in which variable-length coding of syntax elements is performed by using a predetermined table or formula.

The entropy decoder 301 outputs the decoded codes to the parameter decoder 302. Which code is to be decoded is controlled based on an indication of the parameter decoder 302.

Basic Flow

Figure 4:
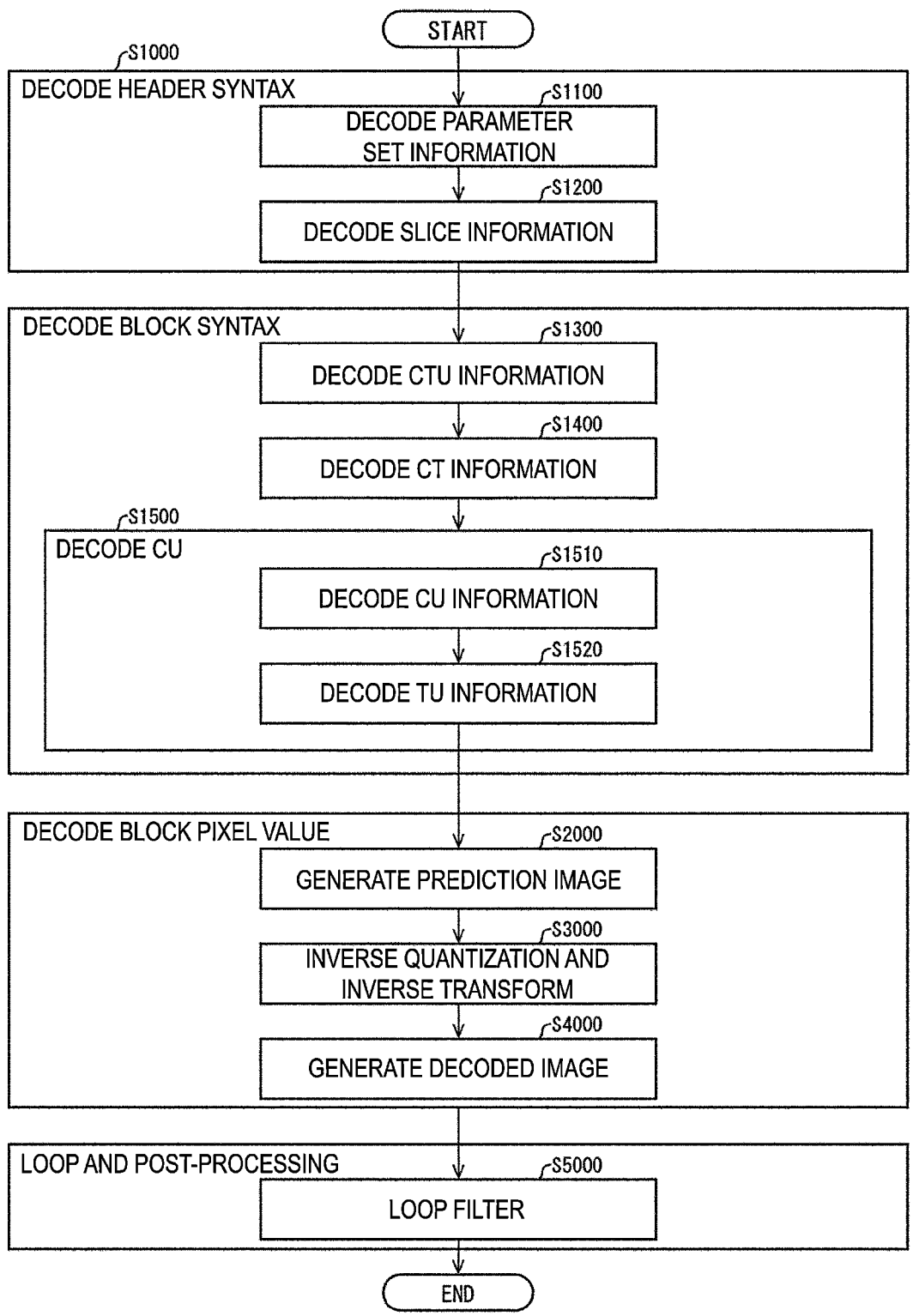
FIG. 4 is a flowchart illustrating general operation of the video decoding apparatus.

FIG. 4 is a flowchart for describing a schematic operation performed by the video decoding apparatus 31.

(S1100: Decoding of parameter set information) The header decoder 3020 decodes parameter set information such as a VPS, an SPS, and a PPS from coded data.

(S1200: Decoding of slice information) The header decoder 3020 decodes a slice header (slice information) from the coded data.

Afterwards, the video decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes CU information, prediction information, a TU split flag, a CU residual flag, and the like from the coded data.

(S1520: Decoding of TU information) In a case that a prediction error is included in the TU, the TU decoder 3024 decodes, from the coded data, a quantization prediction error, a transform index lfnst_idx, and the like.

FIG. 8 is a block diagram of the TU decoder 3024, and includes an RRC unit 30241 and a TSRC unit 30242. The RRC unit 30241 decodes a normal prediction error using transform from the coded data, and the TSRC unit 30242 decodes a prediction error in the transform skip mode.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

The loop filter 305 is a filter provided in the coding loop, and is a filter that removes block distortion and ringing distortion and improves image quality. The loop filter 305 applies a filter such as a deblocking filter, a sample adaptive offset (SAO), and an adaptive loop filter (ALF) to a decoded image of a CU generated by the addition unit 312.

The reference picture memory 306 stores the decoded image of the CU generated by the addition unit 312 in a predetermined position for each target picture and target CU.

The prediction parameter memory 307 stores a prediction parameter in a position predetermined for each CTU or CU to be decoded. Specifically, the prediction parameter memory 307 stores the parameter decoded by the parameter decoder 302, the prediction mode predMode separated by the entropy decoder 301, and the like.

The prediction mode predMode, the prediction parameter, and the like are input to the prediction image generation unit 308. In addition, the prediction image generation unit 308 reads out a reference picture from the reference picture memory 306. The prediction image generation unit 308 generates a prediction image of a block or a subblock by using the prediction parameter and the read reference picture (reference picture block) in the prediction mode indicated by the prediction mode predMode. Here, the reference picture block refers to a set of pixels (referred to as a block because they are normally rectangular) on a reference picture and is a region that is referred to for generating a prediction image.

Configuration of Inter Prediction Parameter Derivation Unit

The inter prediction parameter derivation unit 303 derives an inter prediction parameter with reference to the prediction parameters stored in the prediction parameter memory 307 based on the syntax element input from the parameter decoder 302. In addition, the inter prediction parameter is output to the inter prediction image generation unit 309 and the prediction parameter memory 307.

Inter Prediction Image Generation Unit 309

In a case that predMode indicates the inter prediction, the inter prediction image generation unit 309 generates a prediction image of a block or a subblock through the inter prediction by using the inter prediction parameters input from the inter prediction parameter derivation unit 303 and the reference picture.

The inter prediction image generation unit 309 outputs the generated prediction image of the block to the addition unit 312.

Intra Prediction Image Generation Unit

In a case that predMode indicates the intra prediction, the intra prediction image generation unit performs intra prediction by using an intra prediction parameter input from the intra prediction parameter derivation unit and a reference pixel read from the reference picture memory 306.

The inverse quantization and inverse transform processing unit 311 performs inverse quantization on a quantized transform coefficient input from the parameter decoder 302 to calculate a transform coefficient.

(Derivation of Quantized Transform Coefficient and Residual Coding)

In a case of lossless coding or in a case that the correlation between pixels of the original image is small, the coding efficiency may be higher in a case that no transform is performed. A technique that performs no transform is referred to as Transform Skip. Transform skip is also referred to as Identical Transform, and performs only scaling of transform coefficients in accordance with the quantization parameter. Whether transform skip is used is signaled using a syntax element transform_skip_flag. transform_skip_flag may be signaled for each color component (cIdx) of Y, Cb, or Cr.

A coding method as well as a decoding method for a prediction error differs between normal derivation of a prediction error using transform (Regular Residual Coding (RRC)) and derivation of a prediction error in the transform skip mode (Transform Skip Residual Coding (TSRC)).

Figure 6:
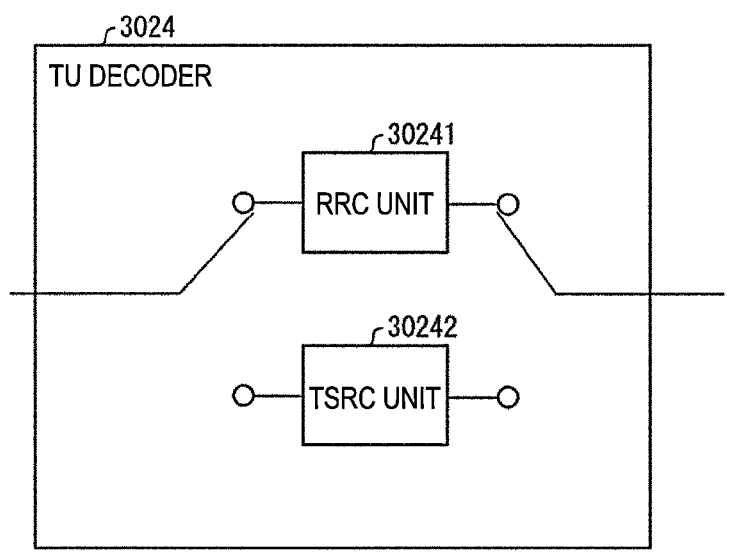
FIG. 6 is a schematic diagram illustrating a configuration of a TU decoder.

FIG. 6 is a block diagram of the TU decoder 3024, which includes the RRC unit 30241 and the TSRC unit 30242. The RRC unit 30241 is a processing unit that derives a normal prediction error using transform, and the TSRC unit 30242 is a processing unit that derives a prediction error in the transform skip mode.

As illustrated in FIG. 7(a), the parameter decoder 302 may decode a parameter sps_sign_prediction_enabled_flag for the sign prediction from the coded data (for example, the SPS). sps_sign_prediction_enabled_flag is a flag indicating whether the sign prediction is used in a CLVS. In a case that sps_sign_prediction_enabled_flag is 1, it is indicated that the sign prediction is used in the CLVS. In a case that sps_sign_prediction_enabled_flag is 0, it is indicated that the sign prediction is not used in the CLVS. The Coded Layer Video Sequence (CLVS) indicates a series of access units (AUs) in the same layer. In a case that the sign prediction is used (sps_sign_prediction_enabled_flag is 1), the parameter decoder 302 may decode sps_num_pred_signs. sps_num_pred_signs indicates the number of signs to be predicted.

sps_lfnst_enabled_flag of FIG. 7(a) is a parameter indicating whether lfnst_idx is present in syntax related to intra coding. In a case that sps_lfnst_enabled_flag is 1, it is indicated that lfnst_idx is present in the syntax related to intra coding. In a case that sps_lfnst_enabled_flag is 0, it is indicated that lfnst_idx is not present in the syntax related to intra coding. sps_explicit_scaling_list_enabled_flag is a parameter indicating whether an explicit scaling list signaled in the scaling list APS is used. In a case that sps_explicit_scaling_list_enabled_flag is 1, it is indicated that the explicit scaling list is used. In a case that sps_explicit_scaling_list_enabled_flag is 0, it is indicated that the explicit scaling list is not used. In a case that sps_lfnst_enabled_flag is 1 and sps_explicit_scaling_list_enabled_flag is 1, sps_scaling_matrix_for_lfnst_disabled_flag is decoded. sps_scaling_matrix_for_lfnst_disabled_flag is a parameter indicating whether a scaling matrix is used for the block to which the non-separable transform is applied. In a case that sps_scaling_matrix_for_lfnst_disabled_flag is 1, it is indicated that the scaling matrix is not used for the block to which the non-separable transform is applied. In a case that sps_scaling_matrix_for_lfnst_disabled_flag is 0, it is indicated that the scaling matrix is used for the block to which the non-separable transform is applied. In a case that sps_scaling_matrix_for_lfnst_disabled_flag is not decoded, it may be inferred to be 0.

As illustrated in FIG. 7(b), in a case that sps_sign_prediction_enabled_flag is 1, the parameter decoder 302 may decode a flag sh_sign_prediction_used_flag related to the sign prediction. sh_sign_prediction_used_flag is a flag indicating whether the sign prediction is used in the current slice. In a case that sh_sign_prediction_used_flag is 1, it is indicated that the sign prediction is used in the current slice. In a case that sh_sign_prediction_used_flag is 0, it is indicated that the sign prediction is not used in the current slice.

FIGS. 8 and 9 and FIGS. 10 and 11 are syntaxes indicating coding and decoding methods for transform coefficients (prediction errors) in RRC and TSRC.

RRC Unit, RRC Mode

In the normal prediction error coding method with no transform skip (FIGS. 8 and 9), the RRC unit 30241 decodes a syntax element (not illustrated) indicating the LAST position to derive the LAST position (LastSignificantCoeffX, LastSignificantCoeffY). The LAST position is the position of the last non-zero coefficient in a case that the transform coefficients of the TU are scanned in a direction from low frequency components to high frequency components. In a case that the transform coefficients (coefficients) are coded or decoded in order of decreasing frequency component, the LAST position indicates the position of a quantized transform coefficient to be decoded first. Then, the RRC unit 30241 decodes sb_coded_flag with reference to the LAST position. The sb_coded_flag is a flag indicating whether a subblock includes a non-zero coefficient. The subblock is a region corresponding to each of 4×4 units into which the TU is split. In a case that sb_coded_flag=1 (the subblock includes a non-zero coefficient), the RRC unit 30241 decodes sig_coeff_flag. sig_coeff_flag is a flag indicating whether the coefficient value is non-zero. In a case that sig_coeff_flag=1 (coefficient value is non-zero), the RRC unit 30241 decodes abs_levelgtx_flag, par_level_flag, abs_remainder, and dec_abs_level. These are syntax elements that indicate the absolute values of the coefficients. abs_level_gtx_flag[n][j] is a flag indicating whether the absolute value of the coefficient at a scan position n is greater than (j<<1)+1. In a case that abs_level_gtx_flag[n][j] is not signaled, abs_level_gtx_flag[n][j] is inferred to be 0. par_level_flag[n] is the parity of the coefficient at the scan position n. In a case that par_level_flag[n][j] is not signaled, par_level_flag[n][j] is inferred to be 0. abs_remainder[n] represents the remaining absolute value of the coefficient at the scan position n and is decoded by a Golomb-Rice code. In a case that abs_remainder[n] is not signaled, abs_remainder[n] is inferred to be 0. dec_abs_level[n] is the absolute value of the residual for deriving the absolute value of the coefficient at the scan position n. In a case that dec_abs_level[n] is not signaled, dec_abs_level[n] is inferred to be 0. The RRC unit 30241 derives the absolute values of the coefficients from these syntax elements. The RRC unit 30241 sets a variable numPredSigns indicating the number of predicted transform coefficients equal to 0. In a case that the sign prediction is not applied or the current number of signs to be predicted is equal to or larger than a maximum number of signs to be predicted in a coefficient being non-zero and for which sign hiding is not used, the RRC unit 30241 decodes a syntax coeff_sign_flag[n] indicating the sign. In a case that the sign prediction is not applied, it is represented by isSignPredicted=0. In a case that the number of signs to be predicted is equal to or larger than the maximum number of signs to be predicted, it is represented by numPredSigns>=maxNumPredSigns. The maximum number of signs to be predicted is 8, for example. Alternatively, the maximum number of signs to be predicted is sps_num_pred_signs. coeff_sign_flag[n] represents the sign of the coefficient at the scan position n. On the other hand, in a case that the sign prediction is applied in a non-zero coefficient, the RRC unit 30241 decodes a sign prediction parameter (coeff_sign_resi_flag[n], coefficient sign prediction error). coeff_sign_resi_flag[n] indicates a prediction error of the sign of the coefficient at the scan position n (whether the prediction is true). Every time the RRC unit 30241 decodes the sign prediction parameter, the RRC unit 30241 increments the number numPredSigns of predicted signs by 1.

In a case that the sign prediction is not applied, the RRC unit 30241 decodes the sign of the transform coefficient from the coded data, and derives the transform coefficient from the absolute value of the coefficient and the decoded sign. On the other hand, in a case that the sign prediction is applied, the RRC unit 30241 derives the sign from a prediction value of the sign derived in the sign prediction unit 31110 and the decoded sign prediction parameter, and derives the transform coefficient from the absolute value of the coefficient and the derived sign. The sign prediction and the sign prediction unit 31110 will be described later.

In a case that all of the following conditions are satisfied, isSignPredicted may be set equal to 1:
  sps_num_pred_signs is larger than 0;
  Transform skip is not used in the target block;
  The width of the TU block size is equal to or larger than a prescribed size (for example, the width is equal to or larger than 4 and the height is equal to or larger than 4);
  The width of the TU block size is equal to or less than maxSize, and the height thereof is equal to or less than maxSize;
  The width of the target subblock size is equal to or larger than a prescribed size (for example, the width is equal to or larger than 4 and the height is equal to or larger than 4);
  The target subblock is present within a range of (spRange)×(spRange) of the top left of the target block.

maxSize is a maximum TU size available for the sign prediction, and is 32 or 128, for example. Alternatively, maxSize may be determined as follows, depending on whether the target block is subjected to intra coding or inter coding.

*maxSize = predMode == MODE_INTRA ? maxSizeIntra: maxSizeInter*

For example, maxSizeIntra is 32, and maxSizeInter is 128. spRange represents a range to which the sign prediction can be applied. spRange is 4 or 32, for example.

Examples of Other Syntax of Sign Prediction

The parameter decoder 302 may use the configurations illustrated in FIG. 12 for decoding of the syntax of the sign prediction. FIG. 12(*a*) is an example of syntax indicating the RRC unit 30241, which is different from FIG. 11. After the RRC unit 30241 decodes the absolute value of the coefficient, in a case that the sign prediction is not applied (isSignPredictedSubTU is 0), the RRC unit 30241 decodes the syntax coeff_sign_flag[n] indicating the sign of the coefficient at the scan position n. In a case that all of the following conditions are satisfied, isSignPredictedSubTU may be set equal to 1:
  isSignPredictedTU is 1;
  The target subblock size is equal to or larger than a prescribed size (for example, the width is equal to or larger than 4 and the height is equal to or larger than 4);
  The target subblock is present within a range of (spRange)×(spRange) of the top left.

In a case that all of the following conditions are satisfied, isSignPredictedTU may be set equal to 1:
  sps_num_pred_signs is larger than 0;
  Transform skip is not used in the target block;
  The width of the TU block size is equal to or larger than a prescribed size (for example, the width is equal to or larger than 4 and the height is equal to or larger than 4);

The width of the TU block size is equal to or less than maxSize, and the height thereof is equal to or less than maxSize.

In a case that the RRC unit 30241 applies sign hiding (signHiddenFlag is 1), the RRC unit 30241 sets signHiddenCoeff[x0][y0][cIdx][x][y] equal to 1. signHiddenCoeff[x0][y0][cIdx][x][y] is a variable indicating whether sign hiding is used for the color component cIdx and the coefficient at the position (x, y) in the TU whose top left position is (x0, y0).

FIG. 12(b) is an example of syntax related to the CU decoder. The CU decoder 3022 decodes the TU included in the CU after decoding the syntax related to transform. NumTUs is the number of TUs included in the CU. In a case that the intra subblock split is used, NumTUs may be set equal to 4. In a case that the subblock transform is used, NumTUs may be set equal to 2. In a case that neither the intra subblock split nor the subblock transform is used, NumTUs may be set equal to 1. The CU decoder 3022 performs a loop related to the color component for each TU. In a case that isSignPredictedTU is 1, the CU decoder 3022 calls syntax sign_prediction (x, y, tbWidth, tbHeight, cIdx) related to the sign prediction for each color component. Here, x and y indicate the top left position (x, y) of the TU. tbWidth indicates the width of the TU, tbHeight indicates the height of the TU, and cIdx indicates the color component.

FIG. 12(c) is an example of syntax related to the sign prediction. The CU decoder 3022 derives width spAreaWidth and height spAreaHeight of a range to which the sign prediction is applied from the block size tbWidth and tbHeight and spRange to which the sign prediction can be applied. Subsequently, the CU decoder 3022 performs the following processing in a coefficient being non-zero and for which sign hiding is not used (AbsLevel[x][y]>0 and signHiddenCoeff[x0][y0][cIdx][x][y] is 0). In a case that the sign prediction is not applied in the target block (isSignPredicted is 0), or the sign prediction is not applied at the target scan position (the current number of signs to be predicted is equal to or larger than the maximum number of signs to be predicted, numPredSigns>=maxNumPredSigns), the CU decoder 3022 decodes the syntax coeff_sign_flag[n] indicating the sign. coeff_sign_flag[n] represents the sign of the coefficient at the scan position n. In contrast, in a case that the sign prediction is applied in the target block and at the scan position n, the CU decoder 3022 decodes the sign prediction parameter (coeff_sign_resi_flag[n], coefficient sign prediction error). coeff_sign_resi_flag[n] indicates a prediction error of the sign of the coefficient at the scan position n (whether the prediction is true). Every time the RRC unit 30241 decodes the sign prediction parameter, the RRC unit 30241 increments numPredSigns by 1. Here, isSignPredicted=isSignPredictedSubTU may be set.

TSRC Unit, TSRC Mode

In the prediction error coding method with no transform (transform skip mode) (FIGS. 10 and 11), the TSRC unit 30242 decodes sb_coded_flag of each subblock. In a case that sb_coded_flag=1 (subblock includes a non-zero coefficient), the TSRC unit 30242 decodes sig_coeff_flag[xC][yC] of the transform coefficient at the position (xC, xC) in the subblock. In a case that sig_coeff_flag=1 (coefficient value is non-zero), the TSRC unit 30242 decodes coeff_sign_flag, abs_level_gtx_flag, par_level_flag, and abs_remainder. These syntax elements indicate the absolute values of the coefficients and are defined as described above. The TSRC unit 30242 derives the absolute values of the coefficients from these syntax elements.

Inverse Quantization and Inverse Transform

Figure 5:
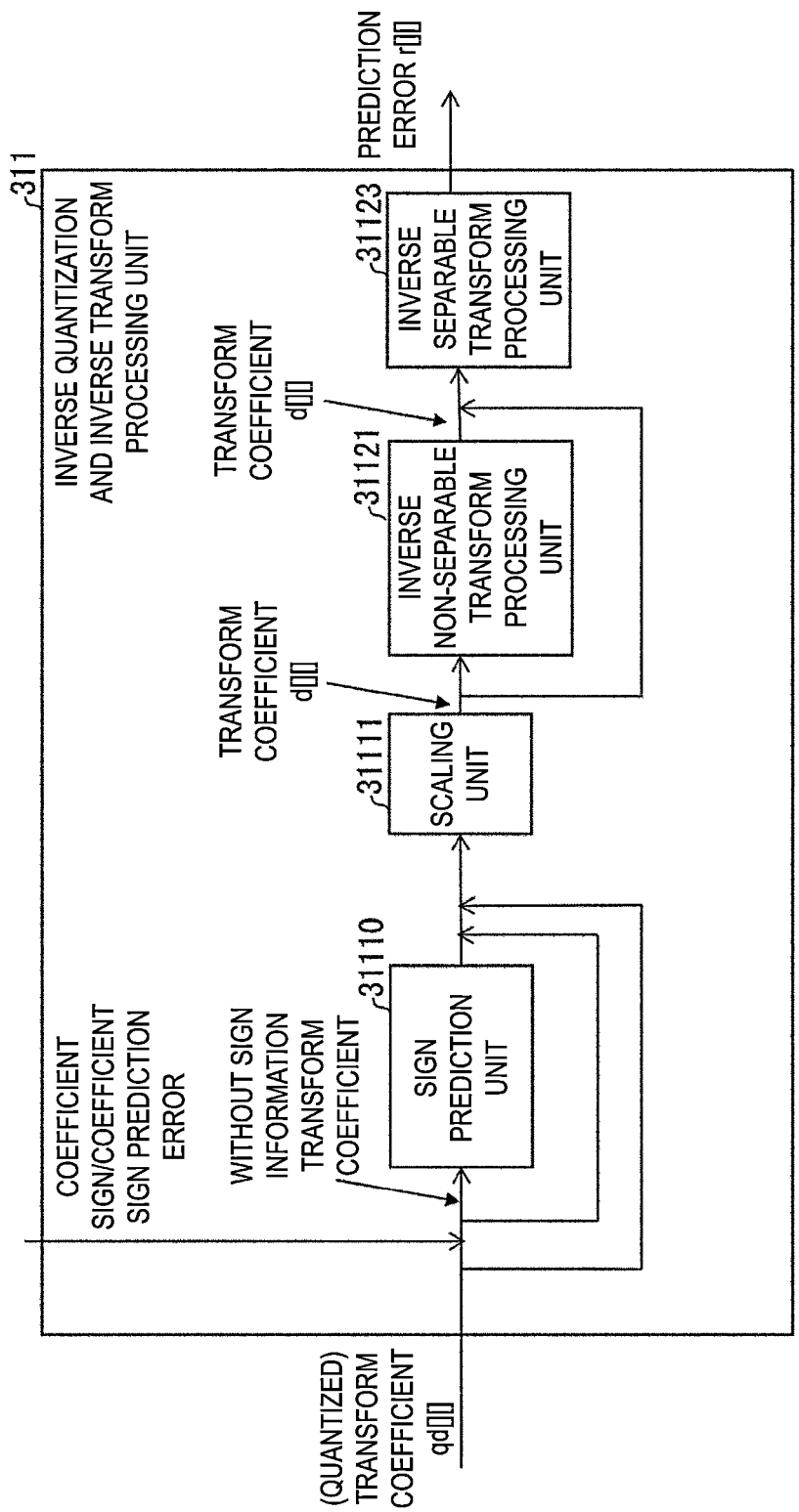
FIG. 5 is a functional block diagram illustrating a configuration example of an inverse quantization and inverse transform processing unit.

FIG. 5 is a block diagram illustrating a configuration of the inverse quantization and inverse transform processing unit 311 according to the present embodiment. The inverse quantization and inverse transform processing unit 311 includes a scaling unit 31111, a sign prediction unit 31110, an inverse non-separable transform processing unit 31121, and an inverse separable transform processing unit 31123.

The inverse quantization and inverse transform processing unit 311 scales (inverse-quantizes) the quantized transform coefficient qd[ ][ ] input from the entropy decoder 301 to derive a transform coefficient without sign information, using the scaling unit 31111. The quantized transform coefficient qd[ ][ ] is obtained by further performing non-separable transform and quantization on a coefficient obtained by performing transform such as Discrete Cosine Transform (DCT) and Discrete Sine Transform (DST) and quantization on a prediction error, or a transformed coefficient, in coding processing. The sign prediction unit 31110 derives the transform coefficient d[ ][ ], using the absolute value of the transform coefficient and the coefficient sign prediction error. In a case that lfnst_idx !=0, the inverse quantization and inverse transform processing unit 311 performs the inverse transform, using the inverse non-separable transform processing unit 31121. Further, inverse separable transform such as inverse DCT and inverse DST is performed on the transform coefficient, and the prediction error is calculated. In a case that lfnst_idx==0, inverse separable transform such as inverse DCT and inverse DST is performed on the transform coefficient scaled by the scaling unit 31111, without causing the inverse non-separable transform processing unit 31121 to perform, and the prediction error is calculated. The inverse quantization and inverse transform processing unit 311 outputs the prediction error to the addition unit 312.

Note that the inverse transform and the transform are paired processing, and thus the transform and the inverse transform may be interpreted as being replaced with each other. Alternatively, the transform may be referred to as forward transform in a case that the inverse transform is referred to as a transform. For example, the non-separable transform may be referred to as a forward non-separable transform in a case that the inverse non-separable transform is referred to as a non-separable transform. The separable transform is simply referred to as transform.

Sign Prediction Unit 31110 and Sign Prediction

In a case that the RRC unit 30241 decodes the signs of all of the coefficients of a transform block without using prediction (isSignPredicted is 0), the scaled transform coefficients are input to the scaling unit 31111. On the other hand, in a case that the RRC unit 30241 derives the signs of all of or a part of the coefficients of a transform block using prediction (isSignPredicted is 1), the transform coefficients and the prediction flag decoded by the TU decoder 3024 are input to the sign prediction unit 31110.

The sign prediction unit 31110 may set the maximum number maxNumPredSigns of signs to be predicted. maxNumPredSigns is 1 to 8, for example. The parameter decoder 302 may decode the maximum number of signs to be predicted as sps_num_pred_signs, and set it equal to maxNumPredSigns.

Regarding the transform coefficients without the sign information, the sign prediction unit 31110 predicts the signs of the transform coefficients using the absolute value of the transform coefficients. Subsequently, the sign prediction unit 31110 modifies the prediction value (prediction sign) of the signs of the transform coefficients, based on the sign prediction parameter (coefficient sign prediction error) decoded in the parameter decoder 302. Specifically, the sign prediction unit 31110 modifies the prediction sign and derives the sign, using XOR of a value of the prediction sign and a value of the coefficient sign prediction error.

Sign=prediction sign XOR coefficient sign prediction error

Here, the modification may be performed on the prediction sign and the coefficient sign prediction error of one transform coefficient. In this case, each of the prediction sign and the coefficient sign prediction error is 0 or 1. Alternatively, the modification may be performed on the prediction sign and the coefficient sign prediction error of a sequence of multiple transform coefficients. In this case, each of the prediction sign and the coefficient sign prediction error is a sequence including 0 or 1.

Note that the sign prediction unit 31110 may invert a prediction sign sign_pred[n] and thereby derive the sign, depending on whether the coefficient sign prediction error is 0 or 1. sign_pred[n] indicates the coefficient sign at the scan position n, and indicates plus in a case of 0 and indicates minus in a case of 1.

$$coeff\_sign\_flag[n] = coeff\_sign\_resi\_flag[n] \mathrel{!}= \theta ? 1 - sign\_pred[n] : sign\_pred[n]$$

The sign prediction unit 31110 may derive a transform coefficient TransCoeffLevel, using the derived sign.

$$TransCoeffLevel = (1 - 2 * coeff\_sign\_flag[n]) * AbsLevel$$

Alternatively, the sign prediction unit 31110 may invert the sign of the absolute value AbsLevel[n] of the transform coefficient at the scan position n, and thereby derive a transform coefficient coeff.

$$coeff[n] = AbsLevel[n], tmpCoef = AbsLevel[n]$$

if $(coeff\_sign\_resi\_flag[n] \mathrel{!}= \theta) coeff[n] = -tmpCoef$

The transform coefficient d[x][y] whose sign is predicted and modified is output to the inverse separable transform processing unit 31123 or the inverse non-separable transform processing unit 31121.

Flow of Processing of Sign Prediction

Figure 13:
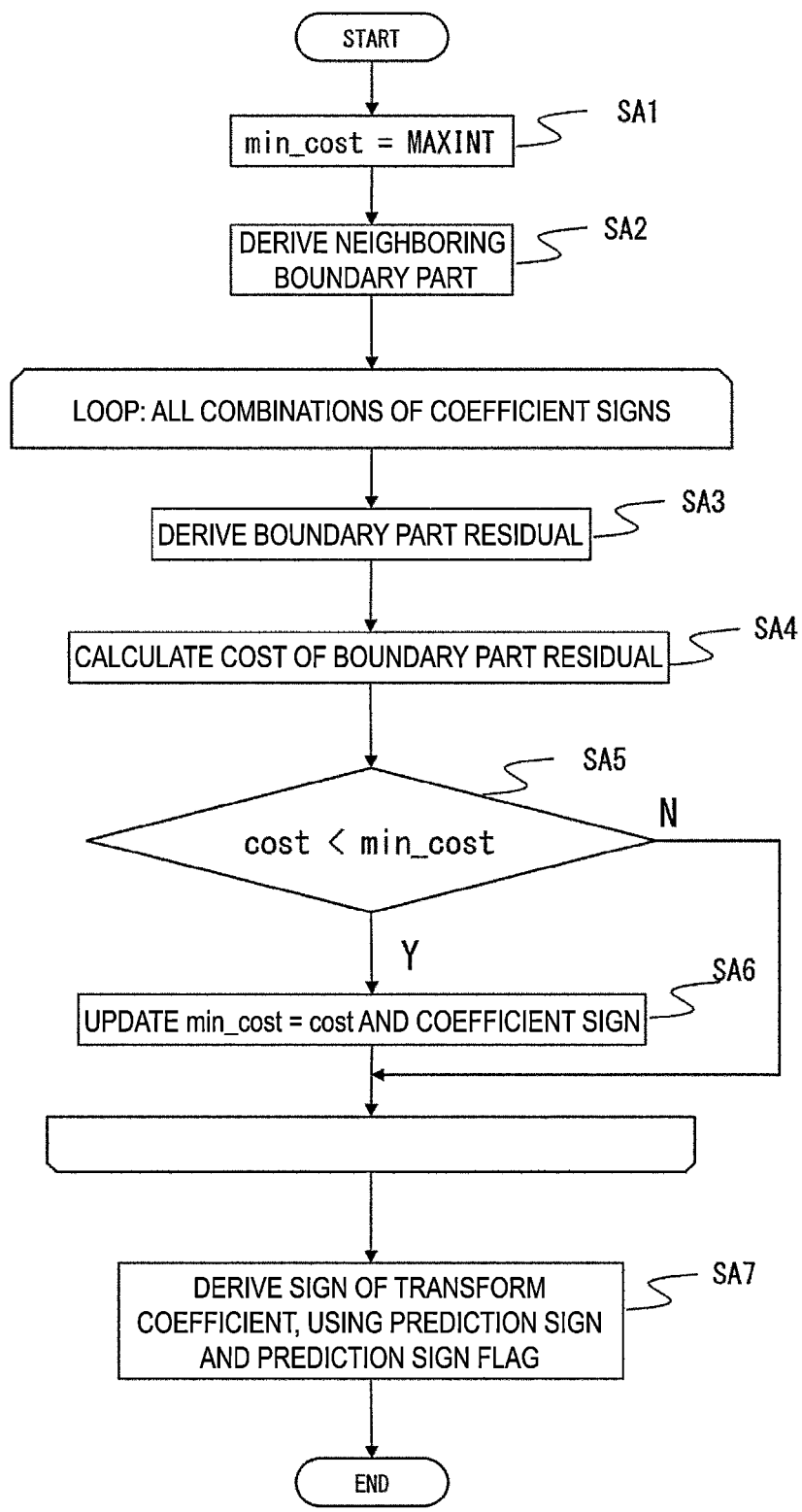
FIG. 13 is a flowchart illustrating a flow of an example of processing in the sign prediction.

FIG. 13 is a flowchart illustrating the sign prediction. The sign prediction unit 31110 sets a value of a variable min_cost equal to a prescribed positive number, for example, an upper limit of an integer (MAXINT) (SA1). Next, the sign prediction unit 31110 derives pixels R located at the boundary of the target block in left and top neighboring blocks (SA2). For all of the combinations of the signs of the transform coefficients as a target of prediction, the sign prediction unit 31110 derives values of residuals (boundary part residuals) in a case that the signs are used. In other words, candidate values of the transform coefficients are derived from the combinations of the candidates of the signs and the absolute value of the transform coefficients. The transform coefficient candidates are inversely transformed, and a boundary part residual r (provisional prediction residual) is derived (SA3). Furthermore, the sum of the boundary part residual r and a prediction image P of the target block may be derived as a temporary provisional decoded image in the boundary part. The sign prediction unit 31110 calculates a cost in the top direction and a cost in the left direction, using the pixels R adjoining in the top direction and the left direction and the pixels derived in SA2 and SA3 (SA4).

Furthermore, the sign prediction unit 31110 performs prediction of the signs, using the cost in the top direction and the cost in the left direction. Specifically, the sign prediction unit 31110 determines whether a value of a cost being the sum of the cost in the top direction and the cost in the left direction is smaller than a value of the current optimal cost min_cost (SA5). In a case that the value of the cost is smaller than the value of min_cost (Y in SA5), the sign prediction unit 31110 updates the value of min_cost with the value of the cost, and stores (updates) a combination of the signs of the transform coefficients corresponding to min_cost (SA6). On the other hand, in a case that the value of the cost is equal to or more than the value of min_cost (N in SA5), the sign prediction unit 31110 does not perform the processing of Step SA6.

The sign prediction unit 31110 repeats the processing from Steps SA3 to SA6 for prescribed combinations of the signs of the transform coefficients being a prediction target. The sign prediction unit 31110 sets the combination of the signs of the transform coefficients corresponding to the value of min_cost at the time point of end of the loop equal to the prediction sign of the transform coefficient. Here, the prescribed combinations may be all of the combinations of the signs of the transform coefficients in which the signs are not decoded from the coded data.

Finally, the sign prediction unit 31110 modifies the derived prediction sign of the transform coefficient, based on the sign prediction parameter (coefficient sign prediction error) input from the parameter decoder 302 (SA7).

Generation of Boundary Part Residual Using Templates

An example of a calculation method of the cost (for example, the residual) in the boundary part of the target block by the sign prediction unit 31110 will be described below. The sign prediction unit 31110 performs calculation of the cost, using provisional decoded pixel values of top edge pixels and left edge pixels of the target block and the pixels R adjoining on the top side or the left side of the target block. A method to be described later (calculation of the cost) may be used as calculation of the cost. The provisional decoded pixel values of the target block are derived from the sum of a prediction value r of the residual and the prediction image P of the target block.

The sign prediction unit 31110 may perform inverse transform processing and generate the boundary part residuals for all of the combinations of the signs of the transform coefficients as the prediction target. However, the sign prediction unit 31110 can generate the boundary part residual with high efficiency by performing calculation using templates.

FIG. 14(a) is a diagram illustrating an example of coefficients as the prediction target. FIGS. 14(b) to (d) are diagrams illustrating templates different from each other. With reference to FIGS. 14(a) to (d), a calculation method using the templates will be described below.

In the following example, c(x, y) indicates the transform coefficient at coordinates (x, y) (x=0, . . . , 3, y=0, . . . , 3). In the following example, prediction of the signs is performed from a state in which the absolute value is known regarding the following three transform coefficients, which is illustrated in FIG. 14(a).

$$c(2, 2) = -1$$
$$c(1, 2) = -5$$
$$c(1, 0) = +2$$

Note that prediction is not performed for the transform coefficients other than c(2, 2), c(1, 2), and c(1, 0), and thus decoded signs of syntax are used for the transform coefficients.

In the following example, the boundary part residual is represented by Habc. Here, a, b, and c respectively correspond to the signs of c(2, 2), c(1, 2), and c(1, 0), each of which is 0 or 1. In a case that a, b, and c are 0, the corresponding transform coefficients are positive, and in a case that a, b, and c are 1, the corresponding transform coefficients are negative.

In this case, the sign prediction unit 31110 generates the boundary part residual through the following procedure. First, in a case that coefficients of all of the signs are positive, that is, regarding the following, the sign prediction unit 31110 generates a boundary part residual H000 through the inverse transform processing.

$$c(2, 2) = +1$$
$$c(1, 2) = +5$$
$$c(1, 0) = +2$$

Next, as illustrated in FIGS. 14(b) to (d), in a case that the sign of only one of the transform coefficients as the prediction target is positive and the absolute value of other coefficients is 0, that is, regarding each of the following, the sign prediction unit 31110 generates a boundary part residual through the inverse transform processing.

$c(1, 0) = +2, c(1, 2) = 0, c(2, 2) = 0$ (see (b) of FIG. 14)  (A)

$c(1, 0) = 0, c(1, 2) = +5, c(2, 2) = 0$ (see (c) of FIG. 14)  (B)

$c(1, 0) = 0, c(1, 2) = 0, c(2, 2) = +1$ (see (d) of FIG. 14)  (C)

Here, the boundary part residuals in the cases of (A) to (C) above are respectively expressed as templates T001, T010, and T100. In this case, the sign prediction unit 31110 can calculate the boundary part residual Habc other than H000, using the following expression.

$$H001 = H000 - 2*T001$$
$$H010 = H000 - 2*T010$$
$$H011 = H010 - 2*T001$$
$$H100 = H000 - 2*T100$$
$$H101 = H100 - 2*T001$$
$$H110 = H100 - 2*T010$$
$$H111 = H110 - 2*T001$$

According to the above procedure, after generating the boundary part residual H000 and the templates T001, T010, and T100 through the inverse transform processing, the sign prediction unit 31110 can generate other boundary part residuals through subtraction processing. Thus, the amount of processing of the boundary part residuals corresponding to all (eight) of the combinations of the signs of the coefficients as the prediction target can be reduced as compared to a case of generating each through the inverse transform processing.

Similarly, also in a case that the number of transform coefficients as the prediction target is 1, 2, 4, or greater, by generating only the following through the inverse transform processing, the boundary part residuals can be generated without performing the inverse transform processing for other combinations:

Boundary part residual in a case that the signs of the transform coefficients as the prediction target are all positive;

Boundary part residual (template) of each transform coefficient in a case that the sign of any one of the transform coefficients as the prediction target is positive and the absolute value of other transform coefficients is 0.

Calculation of Cost

A calculation method of the boundary part residual by the sign prediction unit 31110 will be described below. Note that, in the following description as well, "top" means a direction in which the y coordinate is decreased and "left" means a direction in which the x coordinate is decreased.

FIG. 15 is a diagram illustrating the boundary part residuals and pixels around the boundary part residuals. As illustrated in FIG. 15, in each provisional decoded image, the following pixel values are referred to, with top left coordinates of the target block being (0, 0):

Pixels P(x, 0) of prediction images at coordinates (0, 0) to (3, 0) located at a top edge of the target block;

Pixels P(0, y) of prediction images at coordinates (0, 0) to (0, 3) located at a left edge of the target block;

Pixels r(x, 0) of boundary part residuals at coordinates (0, 0) to (3, 0) located at a top edge of the target block;

Pixels r(0, y) of boundary part residuals at coordinates (0, 0) to (0, 3) located at a left edge of the target block;

Pixels R(x, −1) and R(x, −2) at coordinates (0, −1) to (3, −1) and coordinates (0, −2) to (3, −2) of blocks adjoining on the top side of the target block;

Pixels R(−1, y) and R(−2, y) at coordinates (−1, 0) to (−1, 3) and coordinates (−2, 0) to (−2, 3) of blocks adjoining on the left side of the target block.

Here, x=0, . . . , tbWidth-1, and y=0, . . . , tbHeight-1. Although FIG. 15 illustrates blocks with tbWidth=4 and tbHeight=4, the same applies to all of the block sizes.

The sign prediction unit 31110 calculates the cost cost, using the following expression of F_COST1.

$$\text{cost} = costU + costL \quad \langle F\_COST1 \rangle$$

$costU =$ $$\sum |(-R(x, -2) + 2*R(x, -1) - P(x, 0)) - r(x, 0)| \ (x = 0 \ldots tbWidth - 1)$$

$costL =$ $$\sum |(-R(-2, y) + 2*R(-1, x) - P(0, y)) - r(0, y)| \ (y = 0 \ldots tbHeight - 1)$$

Here, for cost, the following expression of F_COST2 may be used.

$$cost = costU + costL \quad \langle F\_COST2\rangle$$

$$costU = \sum |R(x, -1) - (P(x, 0) + r(x, 0))| \ (x = 0 \ ... \ tbWidth - 1)$$

$$costL = \sum |R(-1, x) - (P(0, y) + r(0, y))| \ (y = 0 \ ... \ tbHeight - 1)$$

costU indicates the cost for the pixels adjoining on the top side (cost in the top direction), and costL indicates the cost for the pixels adjoining on the left side (cost in the left direction). R(x, y) represents a decoded pixel value at the coordinates (x, y) of a neighboring block, P(x, y) represents a prediction pixel value at the coordinates (x, y) of the target block, and r(x, y) represents a residual value at the coordinates (x, y) of the target block. The sum obtained by adding the residual value to the prediction pixel value corresponds to the decoded pixel value of the target block (R'(x, y) of FIG. 15).

Other Embodiment of Sign Prediction: Transform Coefficient Sort

The sign prediction unit 31110 may predict the signs in descending order of the absolute value AbsLevel of the transform coefficient. Specifically, the sign prediction unit 31110 may perform sorting in ascending order regarding AbsLevel[n] at the position n decoded by the TU decoder 3024, and perform prediction in descending order.

Furthermore, in a case that dependent quantization is used (sh_dep_quant_used_flag is 1), the sign prediction unit 31110 performs temporary inverse quantization on AbsCoeff. sh_dep_quant_used_flag is a flag indicating whether dependent quantization is used in the current slice, and in a case of 1, it is indicated that dependent quantization is used. The temporary inverse quantization is processing of updating a state according to an update expression of state at each scan position n, and adding and subtracting an offset according to state to and from a left shift value of AbsLevel[n]. The sign prediction unit 31110 may perform the following processing as the processing of the temporary inverse quantization. n is a scan position of the transform coefficient.

```
state = 0
for each n // for (n = lastScanIdx; n >= 0; n--)
    level = AbsLevel[n]
    qIdx = (level ≪ 1) - (state & 1)
    state = ((stateTransTab ≫ ((state ≪ 3) + ((level & 1) ≪ 2))) & 15)
``` stateTransTab is one of 0, 587280912, and 6274468666787591456, and the parameter decoder 302 may decode information indicating which is used. The sign prediction unit 31110 may perform sorting regarding the transform coefficient (qIdx) subjected to the temporary inverse quantization, and perform the sign prediction in order from the transform coefficient having a large value. In a case that the dependent quantization has four levels or eight levels, the following processing may be performed respectively.

$$qIdx = (level \ll 3) - (state \ \& \ 3)$$

$$qIdx = (level \ll 4) - (state \ \& \ 7)$$

Because the candidates of the signs are predicted in order from the transform coefficient having a large impact on the boundary part residuals, more accurate sign prediction can be performed, and there is an effect that coding efficiency enhances.

Other Embodiment of Sign Prediction: LFNST

The sign prediction unit 31110 may change the maximum number maxNumPredSigns of signs to be predicted depending on whether the non-separable transform (LFNST) is used. Specifically, the sign prediction unit 31110 may set maxNumPredSigns as follows.

$$\max NumPredSigns = ApplyfnstFlag[cIdx] == 0 \ ? \ sps\_num\_pred\_signs : 4$$

Note that maxNumPredSigns is not limited to the above numbers.

Other Embodiment of Sign Prediction: Block Size Restriction

The parameter decoder 302 may apply the sign prediction, using the block size. Specifically, the parameter decoder 302 decodes a maximum block size spArea available for the sign prediction, and the sign prediction unit 31110 derives signPredWidth and signPredHeight as follows.

$$signPredWidth = \min(width, spArea)$$

$$signPredHeight = \min(height, spArea)$$

width and height are the width and the height of the target block size. The sign prediction unit 31110 performs the sign prediction on the transform coefficients within a range indicated by (signPredWidth)×(signPredHeight) from the top left of a target TU block.

Other Embodiment of Sign Prediction: Block Size Dependence

In the sign prediction, as the number of signs to be predicted increases, the number of boundary part residuals exponentially increases, and accordingly a necessary amount of calculation also increases. For example, in a case that the number of signs to be predicted is 8, this requires 2^8 =256 calculations. Because the amount of calculation (the number of boundary part residuals) per pixel determines throughput, it is preferable that the number of signs to be predicted be equal to or less than a prescribed value.

In the present embodiment, the maximum number maxNumPredSigns of signs to be predicted is changed depending on the block size. The sign prediction unit 31110 may derive maxNumPredSigns as follows, depending on the width and the height of the block.

$$maxNumPredSigns = \log 2(width) + \log 2(height) - 2$$

According to the above expression, for example, in a case that the block size is 4×4, maxNumPredSigns is 2, and in a case of 16×16, maxNumPredSigns is 6. In this case, the following expression holds.

$$\text{Amount of calculation} = 2 \wedge (\log2(width) + \log2(height) - 2)/(width * height)$$

$$= (2 \wedge \log2(width) * 2 \wedge \log2(height)/2 \wedge 2)/(width * height)$$

$$= \text{width} * \text{height}/4/(\text{width} * \text{height})$$

$$= 1/4$$

From the above expression, for all of width and height, the number of boundary part residuals (the amount of calculation) per pixel is 0.25.

The sign prediction unit 31110 may derive maxNumPredSigns as follows.

$$\text{max}NumPredSigns = \log2(\text{width}) + \log2(\text{height}) - NPbase$$

Here, NPbase is a prescribed constant of 0 or greater, and is 2 or the like, for example.

For example, in a case that the amount of calculation for one pixel value is NP, maxNumPredSigns can be derived according to the following expression.

$$2^{\wedge}\text{max}NumPredSigns/(\text{width}*\text{height}) = NP$$

$$2^{\wedge}\text{max}NumPredSigns = NP * (\text{width}*\text{height})$$

$$\text{max}NumPredSigns = \log2(NP) + \log2(\text{width}) + \log2(\text{height})$$

Here, in a case that NPbase=−log 2(NP), the above expression is obtained. In a case that NP=1/4, NPbase=2. Derivation may be performed as follows, using the restricted width and height described above.

$$\text{max}NumPredSigns =$$
$$\log2(signPredwidth) + \log2(signPredheight) - NPbase$$

According to the above expression, the amount of calculation for one pixel value is NP, regardless of the block size.

Note that the sign prediction unit 31110 may derive maxNumPredSigns as follows.

$$\text{max}NumPredSigns = NPW * \min(\log2(\text{width}), \log2(\text{height})) - NPbase2$$

Here, each of NPW and NPbase2 is a prescribed constant of 0 or greater, and is 2 or the like, for example. Note that, even with different order of min and log 2, the same values are obtained.

$$\text{max}NumPredSigns = NPW * \log2(\min(\text{width}, \text{height})) - NPbase2$$

According to the above expression, the worst-case complexity is NP.

In a case of a minimum block size, the number of maxNumPredSigns may be reduced. For example, the following may be employed.

maxNumPredSigns=4 (the block size is equal to or smaller than a prescribed size)
maxNumPredSigns=8 (otherwise)
Switching in multiple stages may be employed.
maxNumPredSigns=4 (the block size is equal to or smaller than prescribed size 1)
maxNumPredSigns=6 (else if the block size is equal to or smaller than prescribed size 2)
maxNumPredSigns=8 (otherwise)
The prescribed sizes for the block size are 4×4, 8×8, and the like.

According to the present embodiment, in the sign prediction, the video decoding apparatus and the video coding apparatus change the maximum number of signs of the transform coefficients to be predicted, depending on the block size. Consequently, there is an effect that the worst-case complexity is not increased regardless of the block size.

Other Embodiment of Sign Prediction: Color Component Dependence

The sign prediction unit 31110 may perform derivation by changing the maximum number of signs to be subjected to the sign prediction, depending on luminance or chrominance.

maxNumPredSigns=4 (in a case of luminance)
maxNumPredSigns=2 (in a case of chrominance)

As described above, maxNumPredSigns in the case of luminance is set larger than that in the case of chrominance.

In the configuration described above, in the sign prediction, the video decoding apparatus and the video coding apparatus change the maximum number of signs of the transform coefficients to be predicted, depending on a type of color component. Consequently, many signs are predicted for luminance, which has a large effect, and the number of predictions is restricted for chrominance, which has a small effect. Thus, even with the same amount of calculation, the effect of the sign prediction can be obtained in a well-balanced manner.

Other Embodiment of Sign Prediction: Grouping

In the present embodiment, the transform coefficients (signs) to be predicted are divided into multiple groups, and the signs of the transform coefficients are predicted for each group. For example, in a case that the number of signs to be predicted is 8, 256 calculations for the boundary part residuals are required, whereas in a case of division into two groups each including four, calculations can be reduced to 32 (2^4+2^4) calculations for the boundary part residuals.

Figure 16:
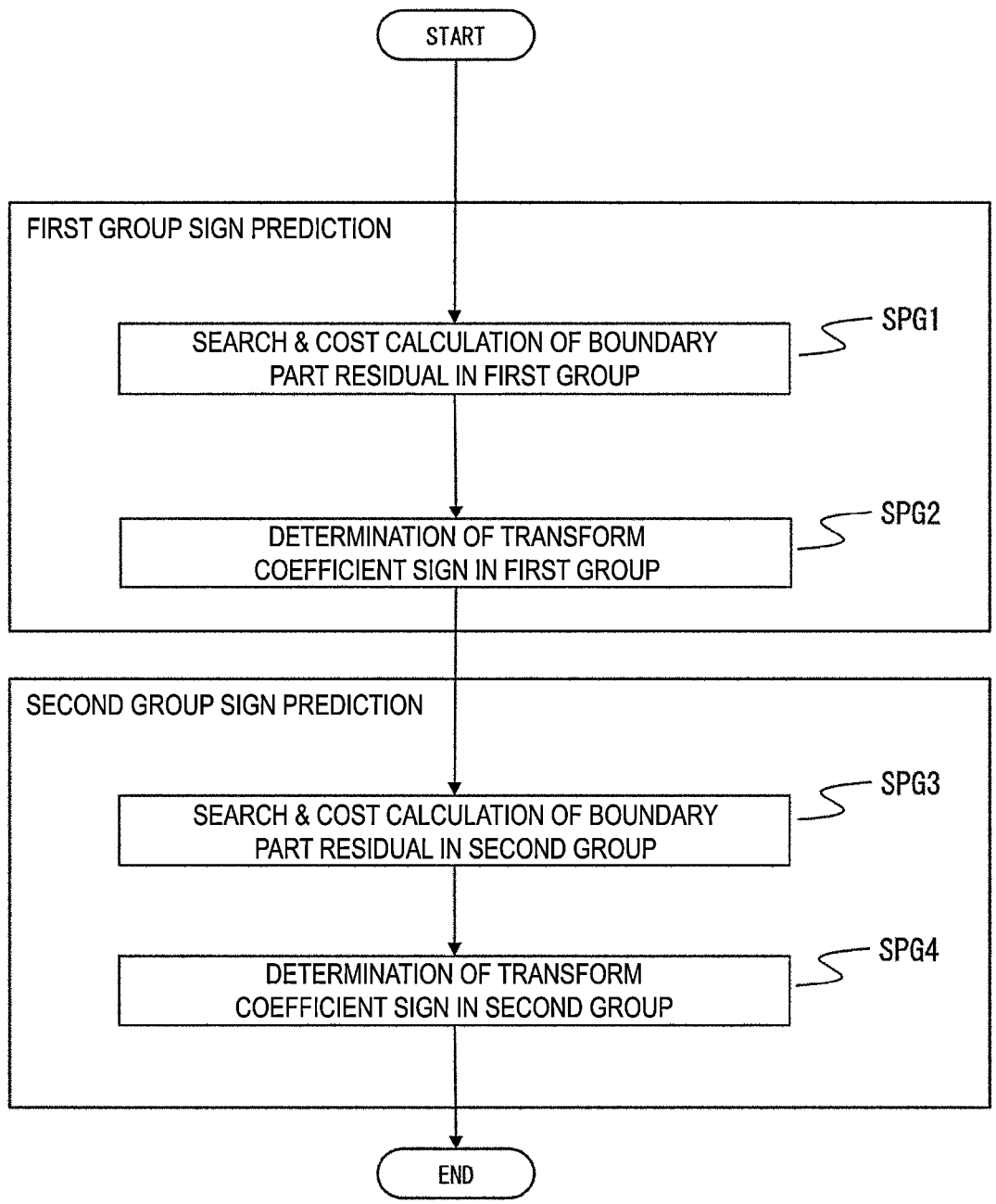
FIG. 16 is a flowchart illustrating a flow of an example of processing in an embodiment of the sign prediction for performing grouping.

FIG. 16 is an example of a flowchart illustrating a flow of processing of the sign prediction in the present embodiment. The sign prediction unit 31110 according to the present embodiment divides the transform coefficients to be predicted into two groups, and performs the prediction of the signs for each group. For example, in a case that the number of transform coefficients to be predicted is 8, the transform coefficients (signs) are divided into two groups, which include four in the first half and four in the second half. The sign prediction unit 31110 performs the sign prediction on the transform coefficients ((maxNumPredSigns/2) transform coefficients, for example, four transform coefficients) in the first group. Specifically, the sign prediction unit 31110 performs cost calculation for each boundary part residual regarding combinations of the signs of the transform coefficients in the first group (SPG1). In the cost calculation in the sign prediction, pixel values around the target block are referred to. Then, the sign prediction unit 31110 selects a boundary part residual having a minimum cost, and determines the signs of the transform coefficients, using the sign prediction parameter (SPG2). In this case, for the sake of simplicity, undetermined transform coefficients in the second group may be calculated without being included in the calculation of the boundary part residuals. The transform coefficients in the second group may be regarded as 0. The sign prediction unit 31110 may perform the same processing as that in the flowchart illustrated in FIG. 13 as the sign prediction for the transform coefficients in the first group.

For example, in a case of the number of transform coefficients to be predicted is 8, 16 boundary part residuals are generated regarding four transform coefficients in the first group.

H0000, H0001, H0010, . . . , H1111

The sign prediction unit 31110 selects a boundary part residual having a minimum cost out of these, and determines the signs of the transform coefficients in the first group.

Subsequently, the sign prediction unit 31110 performs the sign prediction on the transform coefficients ((maxNumPredSigns/2) transform coefficients, for example, four transform coefficients) in the second group, using the transform coefficients in the first group. In other words, the sign prediction unit 31110 performs cost calculation for each boundary part residual regarding combinations of the signs of the transform coefficients in the second group (SPG3). Then, the sign prediction unit 31110 selects a boundary part residual having a minimum cost, and determines the signs of the transform coefficients, using the sign prediction parameter (SPG4). The sign prediction unit 31110 may perform the same processing as that in the flowchart illustrated in FIG. 13 as the sign prediction for the transform coefficients in the second group.

For example, in an example in which the number of transform coefficients to be predicted is 8, 16 boundary part residuals are generated regarding four transform coefficients in the second group.

H0000PQRS, H0001PQRS, H0010PQRS, . . . , H1111PQRS

Here, PQRS is a combination of signs having a minimum cost in the transform coefficients in the first group. In the second group, the signs are derived using the signs determined in the first group. The sign prediction unit 31110 selects a boundary part residual having a minimum cost out of these, and determines the signs of the transform coefficients in the second group.

Note that the number of groups is not limited to two. For example, eight signs may be predicted using four groups each including two transform coefficients. The sign prediction unit 31110 performs the sign prediction for each group. The sign prediction unit 31110 performs the sign prediction on the transform coefficients in a certain group without using the transform coefficients whose signs are not determined (or by replacing them with 0). Consequently, the sign prediction unit 31110 performs the sign prediction for the subsequent groups, using the transform coefficients whose signs are determined.

According to the present embodiment, the video decoding apparatus divides the transform coefficients without the sign information into multiple groups, and performs the sign prediction on the signs of the transform coefficients in each group. Consequently, there is an effect that the amount of calculation is reduced as compared to a case without division into multiple groups.

How to Select Transform Coefficients for First Group and Second Group

The sign prediction unit 31110 may use groups that satisfy the following conditions regarding the transform coefficients for the first group and the second group.

Scan Position Condition

The transform coefficients in the first group may be located on a lower frequency side in scan order than the transform coefficients in the second group. In other words, $i<j$ is satisfied, in a case that the scan position of the transform coefficients in the first group is i and the scan position of the transform coefficients in the second group is j.

Coefficient Absolute Value Condition

As one configuration, the absolute value AbsLevel[i] of the transform coefficients in the first group may be equal to or larger than the absolute value AbsLevel[j] of the transform coefficients in the second group. In other words, the following is satisfied.

$$AbsLevel[i]>=AbsLevel[j]$$

The sign prediction unit 31110 may perform the coefficient absolute value condition in the following embodiments.

Embodiment Combining Grouping and Transform Coefficient Sort

In sorting of the transform coefficients in the sign prediction, prediction accuracy is enhanced through preferential selection of the transform coefficients having a large absolute value, it means a strong impact on cost calculation. On the other hand, in calculation, it is desirable that the sign prediction is performed excluding the transform coefficients, in the group, whose signs are not determined (for example, by not performing addition of undetermined terms, or by replacing the undetermined transform coefficients with 0).

In the present embodiment, grouping of the transform coefficients to be predicted is performed based on the absolute value of the transform coefficients. Specifically, the sign prediction unit 31110 performs sorting depending on the absolute value AbsLevel of the transform coefficients. Subsequently, the sign prediction unit 31110 selects (maxNumPredSigns/2) transform coefficients having a larger absolute value as the transform coefficients in the first group, and selects (maxNumPredSigns/2) transform coefficients having a smaller absolute value as the transform coefficients in the second group. The sign prediction unit 31110 may perform sorting in ascending order, and select top (maxNumPredSigns/2) transform coefficients as the first group and the following (maxNumPredSigns/2) transform coefficients as the second group. Then, the sign prediction unit 31110 performs the sign prediction for each group. Note that, with the method described in Other Embodiment of Sign Prediction: Transform Coefficient Sort, the sign prediction unit 31110 may perform sorting using the transform coefficients qIdx subjected to the temporary inverse quantization, instead of AbsLevel.

For example, in a case that the number of signs of the transform coefficients to be predicted is 8 and these are divided into two groups, the sign prediction unit 31110 may, as a result of the inverse quantization, select four transform coefficients at the position indicating a larger absolute value as the first group and four transform coefficients at the position indicating a smaller absolute value (except 0) as the second group.

According to the present embodiment, there is an effect that the amount of calculation in the sign prediction is reduced with maintained coding efficiency.

Embodiment Combining Grouping and Block Size Dependence

In the 8×8 block, in a case that grouping is not performed, the number of predictions needs to be restricted to 4 in order not to change the worst-case complexity. In the present embodiment, by performing grouping, the number of signs to be predicted is increased without changing the worst-case complexity.

In a case of dividing the maximum number maxNumPredSigns of signs to be predicted into (maxNumPredSigns/2) groups, the sign prediction unit 31110 may set maxNumPredSigns as follows.

$$\mathrm{max}NumPredSigns = (\log2(\text{width}) + \log2(\text{height}) - 3) \ll 1$$

Note that, in a case of the 4×4 block (in a case that signs of two transform coefficients are predicted), the number of boundary part residuals is not changed between cases of dividing and not dividing into two groups. Thus, grouping need not be performed in this case.

According to the present embodiment, signs of a larger number of transform coefficients can be predicted without changing the worst-case complexity, and there is an effect that coding efficiency enhances.

Other Embodiment of Sign Prediction: Exclusion

The sign prediction uses the results of the inverse quantization and the inverse transform of transform coefficients, and thus the sign prediction can not be parallelized with the inverse quantization and the inverse transform. In other words, in a case that the sign prediction is added to the processes of the inverse quantization and the inverse transform, there is a problem in that the number of cycles required until deriving residuals may increase. In the present embodiment, scaling using the sign prediction, the non-separable transform, and the scaling matrix is exclusively performed, and therefore there is an effect that increase in the number of cycles is reduced.

Exclusion of Sign Prediction and Non-Separable Transform
Sequence-Level Exclusion As illustrated in FIG. 17(a), the parameter decoder 302 decodes sps_lfnst_enabled_flag and sps_sign_prediction_enabled_flag from the coded data in order, and decodes sps_sign_prediction_enabled_flag only in a case that sps_lfnst_enabled_flag is 0. In a case that sps_lfnst_enabled_flag is 1, sps_sign_prediction_enabled_flag is not decoded and is inferred to be 0.

The following configuration with the order being changed may be employed.

As illustrated in FIG. 17(b), the parameter decoder 302 decodes sps_sign_prediction_enabled_flag and sps_lfnst_enabled_flag from the coded data in order, and decodes sps_lfnst_enabled_flag only in a case that sps_sign_prediction_enabled_flag is 0. In a case that sps_sign_prediction_enabled_flag is 1, sps_lfnst_enabled_flag is not decoded and is inferred to be 0.

Note that, in the above description, exclusive processing is performed between parameters of the SPS; however, similar decoding processing may be performed between a non-separable transform flag of the SPS and a sign prediction flag sh_sign_prediction_enabled_flag of the slice header to cause exclusive operation.

Target Block-Level Exclusion

In a case that the non-separable transform is used in the target block, that is, in a case that ApplyLfstFlag !=0 (lfnst_idx !=0) in the target block, the sign prediction unit 31110 does not perform the sign prediction in the target block. In a case that the non-separable transform is used in the target block, the parameter decoder 302 decodes the signs instead of the sign prediction parameter.

In a case that all of the following conditions are satisfied, isSignPredicted may be set equal to 1:
sps_num_pred_signs is larger than 0;
Transform skip is not used in the target block;
The width of the TU block size is equal to or larger than 4 and the height of the TU block size is equal to or larger than 4;
The width of the TU block size is equal to or less than maxSize, and the height of the TU block size is equal to or less than maxSize;
The width of the target subblock size is equal to or larger than 4 and the height of the TU block size is equal to or larger than 4;
The target subblock is present within a range of (spRange)×(spRange) from the top left position of the target block;
The non-separable transform is not used in the target block (ApplyLfnstFlag[cIdx]==0).

Alternatively, in a case that all of the following conditions are satisfied, isSignPredicted may be set equal to 1:
isSignPredictedSubTU is 1;
The non-separable transform is not used in the target block (ApplyLfnstFlag[cIdx]==0).

According to the configuration described above, the non-separable transform and the sign prediction are not simultaneously performed, and thus there is an effect of avoiding increase in latency.

Target Block-Level Exclusion 2

In a case that the non-separable transform is used in the target block and the intra template matching prediction is used, the sign prediction unit 31110 does not perform the sign prediction in the target block. In a case that the non-separable transform is used in the target block and the intra template matching prediction is used, the parameter decoder 302 decodes the signs instead of the sign prediction parameter.

In a case that all of the following conditions are satisfied, isSignPredicted may be set equal to 1:
sps_num_pred_signs is larger than 0;
Transform skip is not used in the target block;
The width of the TU block size is equal to or larger than 4 and the height of the TU block size is equal to or larger than 4;
The width of the TU block size is equal to or less than maxSize, and the height of the TU block size is equal to or less than maxSize;
The width of the target subblock size is equal to or larger than 4 and the height of the TU block size is equal to or larger than 4;
The target subblock is present within a range of (spRange)×(spRange) from the top left position of the target block;
The non-separable transform is not used in the target block (ApplyLfnstFlag[cIdx]==0) or the intra template matching prediction is not used (intra_tmpl_flag==0).

Alternatively, in a case that all of the following conditions are satisfied, isSignPredicted may be set equal to 1:
isSignPredictedSubTU is 1;
The non-separable transform is not used in the target block (ApplyLfnstFlag[cIdx]==0) or the intra template matching prediction is not used (intra_tmpl_flag==0).

According to the configuration described above, three of the non-separable transform, the intra template matching prediction, and the sign prediction are not simultaneously performed, and thus there is an effect of avoiding increase in latency.

Target Block-Level Exclusion 3

In a case that in the target block, the non-separable transform is used or the intra template matching prediction is used, the sign prediction unit 31110 does not perform the sign prediction in the target block. In a case that in the target block, the non-separable transform is used and the intra template matching prediction is used, the parameter decoder 302 decodes the signs instead of the sign prediction parameter.

In a case that all of the following conditions are satisfied, isSignPredicted may be set equal to 1:
sps_num_pred_signs is larger than 0;
Transform skip is not used in the target block;
The width of the TU block size is equal to or larger than 4 and the height of the TU block size is equal to or larger than 4;
The width of the TU block size is equal to or less than maxSize, and the height of the TU block size is equal to or less than maxSize;
The width of the target subblock size is equal to or larger than 4 and the height of the TU block size is equal to or larger than 4;
The target subblock is present within a range of (spRange)×(spRange) from the top left position of the target block;
The non-separable transform is not used in the target block (ApplyLfnstFlag[cIdx]==0) and the intra template matching prediction is not used (intra_tmpl_flag==0).

Alternatively, in a case that all of the following conditions are satisfied, isSignPredicted may be set equal to 1:
isSignPredictedSubTU is 1;
The non-separable transform is not used in the target block (ApplyLfnstFlag[cIdx]==0) and the intra template matching prediction is not used (intra_tmpl_flag==0).

According to the configuration described above, the non-separable transform, the intra template matching prediction, and the sign prediction are not simultaneously performed, and thus there is an effect of avoiding increase in latency.

Exclusion of Sign Prediction and Intra Template Matching Prediction

In a case that the intra template matching prediction is used in the target block, the sign prediction unit 31110 does not perform the sign prediction in the target block. In a case that the intra template matching prediction is used in the target block, the parameter decoder 302 decodes the signs instead of the sign prediction parameter.

In a case that all of the following conditions are satisfied, isSignPredicted may be set equal to 1:
sps_num_pred_signs is larger than 0;
Transform skip is not used in the target block;
The width of the TU block size is equal to or larger than 4 and the height of the TU block size is equal to or larger than 4;
The width of the TU block size is equal to or less than maxSize, and the height of the TU block size is equal to or less than maxSize;
The width of the target subblock size is equal to or larger than 4 and the height of the TU block size is equal to or larger than 4;
The target subblock is present within a range of (spRange)×(spRange) from the top left position of the target block;
The intra template matching prediction is not used in the target block (intra_tmpl_flag==0).

Alternatively, in a case that all of the following conditions are satisfied, isSignPredicted may be set equal to 1:
isSignPredictedSubTU is 1;
The intra template matching prediction is not used in the target block (intra_tmpl_flag=0).

According to the configuration described above, the intra template matching prediction and the sign prediction are not simultaneously performed, and thus there is an effect of avoiding increase in latency.

Exclusion of Scaling Using Sign Prediction and Scaling Matrix

Sequence-Level Exclusion

As illustrated in FIG. 17(*c*), the parameter decoder 302 decodes sps_explicit_scaling_list_enabled_flag and sps_sign_prediction_enabled_flag from the coded data in order, and decodes sps_sign_prediction_enabled_flag only in a case that sps_explicit_scaling_list_enabled_flag is 0. In a case that sps_explicit_scaling_list_enabled_flag is 1, sps_sign_prediction_enabled_flag is not decoded and is inferred to be 0.

The following configuration with the order being changed may be employed.

As illustrated in FIG. 17(*d*), the parameter decoder 302 decodes sps_sign_prediction_enabled_flag and sps_explicit_scaling_list_enabled_flag from the coded data in order, and decodes sps_explicit_scalingjlist_enabled_flag only in a case that sps_sign_prediction_enabled_flag is 0. In a case that sps_sign_prediction_enabled_flag is 1, sps_explicit_scaling_list_enabled_flag is not decoded and is inferred to be 0.

Note that, in the above description, exclusive processing is performed between parameters of the SPS; however, similar decoding processing may be performed between the scaling matrix of the SPS and the sign prediction flag sh_sign_prediction_enabled_flag of the slice header to cause exclusive operation.

Target Block-Level Exclusion

In a case that the scaling matrix is used in the target block, the sign prediction unit 31110 does not perform the sign prediction in the target block. In a case that the scaling matrix is used in the target block, the parameter decoder 302 decodes the signs instead of the sign prediction parameter.

In this case, in a case that all of the following conditions are satisfied, isSignPredicted may be set equal to 1:
sps_num_pred_signs is larger than 0;
Transform skip is not used in the target block;
The width of the TU block size is equal to or larger than 4 and the height of the TU block size is equal to or larger than 4;
The width of the TU block size is equal to or less than maxSize, and the height of the TU block size is equal to or less than maxSize;
The width of the target subblock size is equal to or larger than 4 and the height of the TU block size is equal to or larger than 4;
The target subblock is present within a range of (spRange)×(spRange) from the top left position of the target block;
The scaling matrix is not used in the target block (one or more of SMXCondition to be described later are satisfied).

Alternatively, in a case that all of the following conditions are satisfied, isSignPredicted may be set equal to 1:
isSignPredictedSubTU is 1;
The scaling matrix is not used in the target block (one or more of SMXCondition to be described later are satisfied).

According to the configuration described above, the scaling matrix and the sign prediction are not simultaneously performed, and thus there is an effect of avoiding increase in latency.

Scaling Unit 31111

With the use of a quantization parameter and a scaling factor derived in the parameter decoder 302, the scaling unit 31111 performs scaling on the transform coefficients decoded by the TU decoder 3024 or derived by the sign prediction unit 31110, using a weight for each coefficient.

The scaling unit 31111 determines whether the scaling matrix is used, and in a case that no use is indicated, the scaling unit 31111 sets a scaling list m[x][y] equal to a fixed value (for example, 16). In contrast, in a case that use is indicated, the scaling unit 31111 sets m[x][y] equal to a value ScalingMatrixRec decoded from the coded data. Note that, in a case that one or more conditions in the following SMXCondition are satisfied, the scaling unit 31111 may determine that the scaling matrix is not used.

sh_explicit_scaling_list_used_flag == 0    (SMXCondition)

transform_skip_flag == 1 sps_scaling_matrix_for_lfnst_disabled_flag ==

1 && *ApplyLfnstFlag*[cIdx] == 1 sps_scaling_matrix_for_alternative_colour_space_disabled_flag ==

1 && sps_scaling_matrix_designated_colour_space_flag == cu_act_enabled_flag sps_scaling_matrix_for_alternative_colour_space_disabled_flag is a flag indicating prohibition of the scaling matrix in an alternative color space. sps_scaling_matrix_designated_colour_space_flag is a flag indicating prohibition of the scaling matrix at the time of color transform. cu_act_enabled_flag is a flag indicating whether color space transform is performed for a residual.

The scaling unit 31111 derives a real scaling list ls[x][y] from m[ ][ ] and a quantization parameter qP. For example, a correction value obtained by referring to an array levelScale is multiplied by qP, and a value dependent on qP is shifted.

$$ls[x][y] = (m[x][y] * levelScale[rectNonTsFlag][qP \%6]) \ll (qP/6)$$

Alternatively, ls[x][y] may be derived using the following expression.

$$ls[x][y] =$$
$$(m[x][y] * levelScale[rectNonTsFlag][(qP+1)\%6]) \ll ((qP+1)/6)$$

Here, levelScale[ ][ ]={{40, 45, 51, 57, 64, 72}, {57, 64, 72, 80, 90, 102}}.

The scaling unit 31111 derives dnc[ ][ ] from the product of the real scaling list ls[ ][ ] and the decoded transform coefficient TransCoeffLevel, and performs the inverse quantization.

$$dnc[x][y] =$$
$$(TransCoeffLevel[xTbY][yTbY][cIdx][x][y] * ls[x][y] + bdOffset) \gg bdShift$$

Finally, the scaling unit 31111 clips the transform coefficient subjected to the inverse quantization and derives d[x][y]. CoeffMin and CoeffMax indicate a range of transform coefficient values.

$$d[x][y] = Clip3(CoeffMin, CoeffMax, dnc[x][y])$$

The scaled transform coefficient d[ ][ ] is transmitted to the inverse separable transform processing unit 31123 or the inverse non-separable transform processing unit 31121. The inverse non-separable transform processing unit 31121 applies the inverse non-separable transform to the transform coefficient d[ ][ ] after the inverse quantization and before the inverse separable transform.

Non-Separable Transform and Inverse Non-Separable Transform

The non-separable transform (second transform) is applied to transform coefficients in a part or the entire region of a TU after the separable transform (DCT2, DST7, and the like) in the video coding apparatus 11. In the non-separable transform, correlation remaining in the transform coefficients is removed, and energy is concentrated on a part of the transform coefficients. The inverse non-separable transform is applied to transform coefficients of a part or the entire region of a TU in the video decoding apparatus 31. After the inverse non-separable transform is applied, an inverse separable transform (such as DCT2 and DST7) is applied to the transform coefficients after the inverse non-separable transform. In a case that a TU is split into 4×4 subblocks, the non-separable transform and the inverse non-separable transform are applied only to a prescribed top left subblock. Examples of sizes of a TU in which one of the width W and the height H of the TU is 4 include 4×4, 8×4, 4×8, L×4, and 4×L (L is a natural number of 16 or greater).

A technique for transmitting only some low-frequency components in transform coefficients after the separable transform is referred to as Reduced Secondary Transform (RST) or Low Frequency Non-Separable-Transform (LFNST). Specifically, in a case that the number nonZero-Size of transform coefficients of the separable transform to be transmitted is less than or equal to the size of the TU subjected to the separable transform ((1<<log 2StSize)×(1<<log 2StSize)), it is LFNST.

In the non-separable transform and the inverse non-separable transform, the following processing is performed depending on the size of the TU and the intra prediction mode (IntraPredMode). The inverse non-separable transform processing will be described below in order.

S1: Setting of Transform Size and Input/Output Size

In the inverse non-separable transform, depending on the size of the TU (width W, height H), the size (4×4 or 8×8) of the inverse non-separable transform, the number (nStOutSize) of output transform coefficients, the number nonZeroSize of transform coefficients (input transform coefficients) to which the inverse non-separable transform is applied, and the number (numStX, numStY) of subblocks to which the inverse non-separable transform is applied are derived. The sizes of the inverse non-separable transforms of 4×4 and 8×8 are indicated by nStSize=4 and 8. In addition, the sizes of the inverse non-separable transforms of 4×4 and 8×8 may also be referred to as RST 4×4 and RST 8×8, respectively.

In the inverse non-separable transform, in a case that the TU is equal to or larger than 8×8, 48 transform coefficients are output through the inverse non-separable transform of RST 8×8.

In other words, nStSize=8 and nStOutSize=48. Otherwise, 16 transform coefficients are output through the inverse non-separable transform of RST 4×4. In other words, nStSize=4 and nStOutSize=16. In the inverse non-separable transform, in a case that the TU is 4×4 or 8×8, input transform coefficients are 8, that is, nonZeroSize=8. Otherwise, input transform coefficients are 16, that is, non-ZeroSize=16.

In a case that W and H are both 8 or greater, log 2StSize=3 and nStOutSize=48
Otherwise, log 2StSize=2 and nStOutSize=16
nStSize=1<<log 2StSize
In a case that both W and H are 4 or 8, nonZeroSize=8
Otherwise, nonZeroSize=16
Note that nonZeroSize is not limited to 8 and 16. For example, it may be 12 or the like. nStOutSize is not limited to 16 and 48 either, and may be 32, 36, 64 or the like.

$$numStX = (nTbH == 4 \;\&\&\; nTbW > 8) \;? \;2:1$$

$$numStX = (nTbW == 4 \;\&\&\; nTbH > 8) \;? \;2:1$$

Note that numStX=numStY=1 may be invariably set without performing the non-separable transform on multiple subblocks.

S2: Rearrangement in One-Dimensional Signal

The inverse non-separable transform processing unit 31121 once rearranges a transform coefficient d[ ][ ] of a part of the TU in a one-dimensional array u[ ] for processing. Specifically, the inverse non-separable transform processing unit 31121 derives u[ ] from the two-dimensional transform coefficient d[ ][ ] of the target TU indicated by a region RU with reference to the transform coefficient of x=0, . . . , nonZeroSize-1. xC and yC are positions on the TU, and are derived from an array DiagScanOrder indicating a scan order and a position x of the transform coefficient in the subblock.

$$xC = (xSbIdx \ll \log2StSize) + DiagScanOrder[\log2StSize][\log2StSize][x][0]$$

$$yC =$$

$$(ySbIdx \ll \log2StSize) + DiagScanOrder[\log2StSize][\log2StSize][x][1]$$

$$u[x] = d[xC][yC]$$

Note that a range copied in the one-dimensional array is referred to as a region RU.

S3: Application of Transform Processing

The inverse non-separable transform processing unit 31121 transforms u[ ] having a length of nonZeroSize using a transform matrix secTransMatrix[ ][ ], and derives a coefficient v[ ] of a one-dimensional array having a length of nStOutSize as an output.

Specifically, the inverse non-separable transform processing unit 31121 derives the transform matrix secTranMatrix[ ][ ] from a set number (lfnstTrSetId) of the non-separable transform, lfnst_idx indicating the transform matrix of the non-separable transform, and the non-separable transform size nStSize (nTrS). lfnstTrSetId is a set number of the non-separable transform derived from the intra prediction mode IntraPredMode. Furthermore, the inverse non-separable transform processing unit 31121 performs a product-sum operation of the transform matrix and the one-dimensional variable u[ ] as indicated in the following expression.

$$v[i] =$$

$$Clip3\left(CoeffMin, CoeffMax, \sum (secTransMatrix[i][j] * u[j] + 64) \gg 7\right)$$

Here, $\Sigma$ is the sum up to j=0, . . . , nonZeroSize-1. In addition, i performs processing on 0, . . . , nStSize-1. CoeffMin and CoeffMax indicate a range of transform coefficient values.

S4: Two-Dimensional Mapping of One-Dimensional Signal after Transform Processing The inverse non-separable transform processing unit 31121 maps the coefficient v[ ] of the transformed one-dimensional array at a prescribed position in the TU again. The mapping method may be changed depending on PredModeIntra.

Specifically, in a case that PredModeIntra<=34, the following processing may be applied.

$$d[x][y] = (y < 4) \;? \;v[x +$$

$$(y \ll \log2StSize)]:((x < 4) \;? \;v[32 + x + ((y - 4) \ll 2)]:d[x][y])$$

Otherwise, the following expression is applied.

$$d[x][y] = (x < 4) \;? \;v[y +$$

$$(x \ll \log2StSize)]:((y < 4) \;? \;v[32 + y + ((x - 4) \ll 2)] :d[x][y])$$

The above-described determination of branching may be "PredModeIntra<=34 or PredModeIntra==INTRA_LT_CCLM, INTRA_T_CCLM, or INTRA_L_CCLM" or the like.

Inverse Separable Transform Processing Unit 31123

The inverse separable transform processing unit 31123 explicitly or implicitly switches the transform matrix. The transform used in the separable transform is separable transform including vertical transform and horizontal transform. Transform of separating a two-dimensional signal into a horizontal direction and a vertical direction may be defined as the separable transform. The transform matrices of the separable transform are DCT2, DST7, DCT8, DCT5, DST4, DST1, and IDT. IDT is identity transform. In the separable transform, the transform matrix is independently switched for each of the vertical transform and the horizontal transform. Note that selectable transform is not limited to the above, and other transform (transform matrix) may be used. The inverse separable transform processing unit 31123 is usually referred to as a transform processing unit.

Separable Transform Processing

The inverse separable transform processing unit 31123 applies the inverse separable transform to the coefficient (transform coefficient) transformed by the inverse non-separable transform processing unit 31121. The inverse separable transform processing unit 31123 may apply the inverse separable transform not to the transform coefficient output from the inverse non-separable transform processing unit 31121 but to the coefficient (transform coefficient) scaled by the scaling unit 31111. Note that the inverse separable transform processing unit 31123 may skip one or both of the vertical direction and the horizontal direction, and transform (scale) only the magnitude of the transform coefficient.

The inverse separable transform processing unit 31123 selects the transform matrices in the vertical direction and the horizontal direction out of multiple candidates. In a case of determining the transform matrix out of multiple candidates, there are explicit MTS and implicit MTS. In a case of explicit MTS, mts_idx is decoded from coded data, and the transform matrix is switched. In a case of implicit MTS, mts_idx is derived depending on the block size and whether it is the intra prediction, and the transform matrix is switched.

The inverse separable transform processing unit 31123 transforms a modified transform coefficient d[ ][ ](for example, a transform coefficient subjected to the inverse non-separable transform) to an intermediate value e[ ][ ] through vertical one-dimensional transform, and clips e[ ][ ]. The inverse separable transform processing unit 31123 transforms an intermediate value g[ ][ ] to a prediction residual r[ ][ ] through horizontal one-dimensional transform, and r[ ][ ] is transmitted to the addition unit 312.

More specifically, the inverse separable transform processing unit 31123 derives a first intermediate value e[x][y] according to the following expression.

$$e[x][y] = \sum (transMatrix[y][j] \times d[x][j]) \ (j = 0 \ ... \ nTbS - 1)$$

Here, transMatrix[ ][ ](=transMatrixV[ ][ ]) is a transform matrix of nTbS×nTbS derived using trTypeVer. nTbS is the height nTbH of the TU. In a case of 4×4 transform (nTbS=4) of trType==0 (DCT2), for example, transMatrix={{29, 55, 74, 84}{74, 74, 0, −74}{84, −29, −74, 55}{55, −84, 74, −29}} is used. The symbol E means processing of adding a product of the matrix transMatrix[y][j] and the transform coefficient d[x][j] regarding the suffix j of j=0, . . . , nTbS-1. In other words, e[x][y] is obtained by arranging a column that is obtained by a product of a vector x[j](j=0, . . . , nTbS-1) including d[x][j](j=0, . . . , nTbS-1) being each column of d[x][y] and an element transMatrix[y][j] of the matrix.

The inverse separable transform processing unit 31123 clips the first intermediate value e[x][y], and derives a second intermediate value g[x][y], according to the following expression.

$$g[x][y] = Clip3(coeffMin, coeffMax, (e[x][y] + 64) \gg 7)$$

64 and 7 in the above expression are numerical values determined by bit-depth of the transform matrix, and in the above expression, it is assumed that the transform matrix has 7 bits. coeffMin and coeffMax are a minimum value and a maximum value of clipping, respectively.

The inverse separable transform processing unit 31123 is a transform matrix transMatrix[ ][ ](=transMatrixH[ ][ ]) of nTbS×nTbS derived using trTypeHor. nTbS is the height nTbH of the TU. A horizontal transform processing unit 152123 transforms an intermediate value g[x][y] to a prediction residual r[x][y] through horizontal one-dimensional transform.

$$r[x][y] = \sum transMatrix[x][j] \times g[j][y] \ (j = 0 \ ... \ nTbS - 1)$$

The above symbol E means processing of adding a product of the matrix transMatrix[x][j] and g[j][y] regarding the suffix j of j=0, . . . , nTbS-1. In other words, r[x][y] is obtained by arranging a row that is obtained by a product of g[j][y](j=0, . . . , nTbS-1) being each row of g[x][y] and the matrix transMatrix.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

Configuration of Video Coding Apparatus

Figure 18:
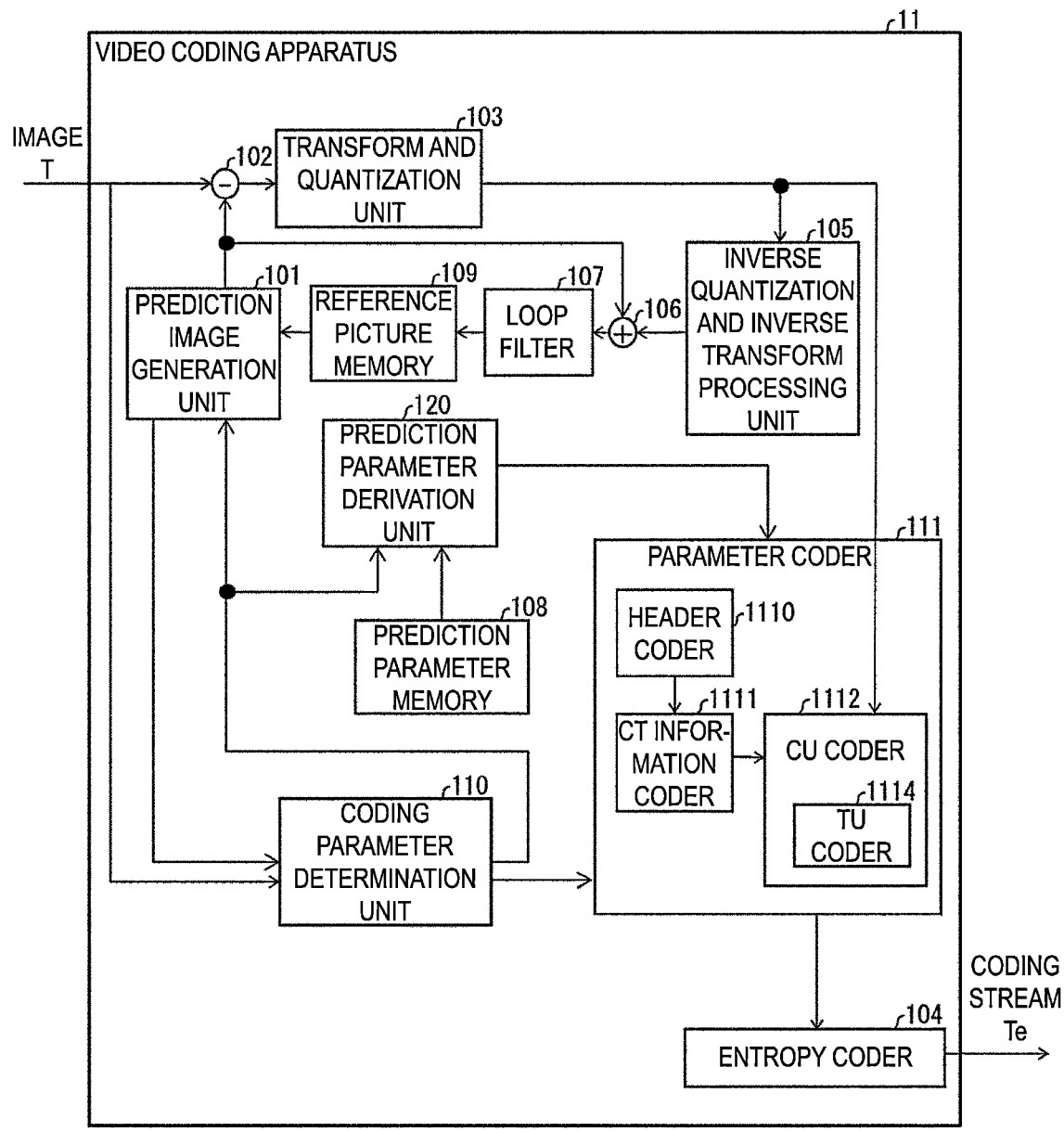
FIG. 18 is a block diagram illustrating a configuration of a video coding apparatus.

Next, a configuration of the video coding apparatus 11 according to the present embodiment will be described. FIG. 18 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit or a frame memory) 108, a reference picture memory (a reference image storage unit or a frame memory) 109, a coding parameter determination unit 110, a parameter coder 111, a prediction parameter derivation unit 120, and an entropy coder 104.

The prediction image generation unit 101 generates a prediction image for each CU. The prediction image generation unit 101 includes the inter prediction image generation unit 309 and intra prediction image generation unit already described, and description of these units is omitted.

The subtraction unit 102 subtracts a pixel value of the prediction image of a block input from the prediction image generation unit 101 from a pixel value of an image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantized transform coefficient by quantization. The transform and quantization unit 103 outputs the quantized transform coefficient to the parameter coder 111 and the inverse quantization and inverse transform processing unit 105.

The transform and quantization unit 103 includes a separable transform processing unit (first transform processing unit), a non-separable transform processing unit (second transform processing unit), and a scaling unit.

The separable transform processing unit applies the separable transform to a prediction error. In a case that ApplyLfnstFlag is not 0, the non-separable transform processing unit performs the non-separable transform. The scaling unit performs scaling for a transform coefficient using a quantization matrix.

Specifically, the transform and quantization unit 103 performs the following processing.

S1: The separable transform processing unit performs the separable transform.

S2: The non-separable transform processing unit determines whether the non-separable transform is enabled (ApplyLfnstFlag !=0).

S3: In a case that the non-separable transform is enabled, the non-separable transform processing unit performs the non-separable transform (forward non-separable transform).

S3B: In a case that the non-separable transform is not enabled, the non-separable transform processing unit does not perform the non-separable transform (forward non-separable transform).

S4: The scaling unit performs scaling for a transform coefficient using a quantization matrix.

In the (forward) non-separable transform, processing substantially equivalent to the inverse non-separable transform is performed.

The inverse quantization and inverse transform processing unit 105 is the same as the inverse quantization and inverse transform processing unit 311 of the video decoding apparatus 31, and descriptions thereof are omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. General operation of each module will be described below.

The header coder 1110 performs coding processing of parameters such as header information, split information, prediction information, and quantized transform coefficients.

The CT information coder 1111 codes the QT and MT (BT, TT) split information and the like.

The CU coder 1112 codes the CU information, the prediction information, the split information, and the like.

In a case that a prediction error is included in the TU, the TU coder 1114 codes the QP update information and the quantization prediction error.

The CT information coder 1111 and the CU coder 1112 supplies, to the parameter coder 111, syntax elements such as the inter prediction parameters (predMode, merge_flag, merge_idx, inter_pred_idc, refIdxLX, mvp_LX_idx, and mvdLX), the intra prediction parameters, and the quantized transform coefficients.

The parameter coder 111 inputs the quantized transform coefficients and the coding parameters (split information and prediction parameters) to the entropy coder 104. The entropy coder 104 entropy-codes the quantized transform coefficients and the coding parameters to generate and output a coding stream Te.

The prediction parameter derivation unit 120 is a means including the inter prediction parameter coder 112 and the intra prediction parameter coder, and derives an intra prediction parameter and an intra prediction parameter from the parameters input from the coding parameter determination unit 110. The derived intra prediction parameter and intra prediction parameter are output to the parameter coder 111.

Configuration of Inter Prediction Parameter Coder

The inter prediction parameter coder includes a parameter coding controller and an inter prediction parameter derivation unit. The inter prediction parameter derivation unit has a configuration common to the video decoding apparatus.

Configuration of Intra Prediction Parameter Coder

The intra prediction parameter coder includes a parameter coding controller and an intra prediction parameter derivation unit. The intra prediction parameter derivation unit has a configuration common to the video decoding apparatus.

However, unlike in the video decoding apparatus, the coding parameter determination unit 110 and the prediction parameter memory 108 provide input to the inter prediction parameter derivation unit 303 and the intra prediction parameter derivation unit, and the input is output to the parameter coder 111.

The addition unit 106 adds, for each pixel, the pixel value for the prediction block input from the prediction image generation unit 101 and the prediction error input from the inverse quantization and inverse transform processing unit 105 to generate a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may include only a deblocking filter, for example.

The prediction parameter memory 108 stores the prediction parameters generated by the coding parameter determination unit 110 at a predetermined position for each target picture and CU.

The reference picture memory 109 stores the decoded image generated by the loop filter 107 at a predetermined position for each target picture and CU.

The coding parameter determination unit 110 selects one set among multiple sets of coding parameters. The coding parameters include QT, BT, or TT split information described above, a prediction parameter, or a parameter to be coded which is generated in relation to the aforementioned elements. The prediction image generation unit 101 generates a prediction image by using these coding parameters.

The coding parameter determination unit 110 calculates an RD cost value indicating the magnitude of an amount of information and a coding error for each of the multiple sets. The RD cost value is, for example, the sum of an amount of code and the value obtained by multiplying a square error by a coefficient λ. The code amount is an amount of information of the coding stream Te obtained by performing entropy coding on a quantization error and a coding parameter. The square error is the square sum of prediction errors calculated by the subtraction unit 102. The coefficient λ is a real number greater than a preset zero. The coding parameter determination unit 110 selects a set of coding parameters of which the calculated cost value is a minimum value. The coding parameter determination unit 110 outputs the determined coding parameters to the parameter coder 111 and the prediction parameter derivation unit 120.

Note that a computer may be used to implement some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, a parameter coder 111, and the prediction parameter derivation unit 120. In that case, this configuration may be realized by recording a program for realizing such control functions on a computer-readable recording medium and causing a computer system to read and perform the program recorded on the recording medium. Note that the "computer system" described here refers to a computer system built into either the video coding apparatus 11 or the video decoding apparatus 31 and is assumed to include an OS and hardware components such as a peripheral apparatus. In addition, the "computer-readable recording medium" refers to a portable medium such as a flexible disk, a magneto-optical disk, a ROM, and a CD-ROM, and a storage apparatus such as a hard disk built into the computer-system. Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a certain period of time, such as a volatile memory included in the computer system functioning as a server or a client in such a case. In addition, the above-described program may be one for implementing some of the above-described functions, and also may be one capable of implementing the above-described functions in combination with a program already recorded in a computer system.

A part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. In addition, the circuit integration technique is not limited to LSI, and implementation as a dedicated circuit or a multi-purpose processor may be adopted. In addition, in a case that a circuit integration technology that replaces LSI appears as the semiconductor technologies advance, an integrated circuit based on that technology may be used.

Although embodiments of the present invention have been described above in detail with reference to the drawings, the specific configurations thereof are not limited to those described above and various design changes or the like can be made without departing from the spirit of the invention.

An embodiment of the present invention is not limited to the embodiments described above and various changes can be made within the scope indicated by the claims. That is, embodiments obtained by combining technical means appropriately modified within the scope indicated by the claims are also included in the technical scope of the present invention.

INDUSTRIAL APPLICABILITY

The embodiments of the present invention can be preferably applied to a video decoding apparatus for decoding coded data in which image data is coded, and a video coding apparatus for generating coded data in which image data is coded. In addition, the embodiments of the present invention can be preferably applied to a data structure of coded data generated by the video coding apparatus and referred to by the video decoding apparatus.

CROSS-REFERENCE OF RELATED APPLICATION

The present application claims priority of JP 2022-025299, filed on Feb. 22, 2022, and all the contents thereof are included herein by the reference.

REFERENCE SIGNS LIST

31 Video decoding apparatus
301 Entropy decoder
302 Parameter decoder
3022 CU decoder
3024 TU decoder
30241 RRC unit
305, 107 Loop filter
306, 109 Reference picture memory
307, 108 Prediction parameter memory
308, 101 Prediction image generation unit
309 Inter prediction image generation unit
311, 105 Inverse quantization and inverse transform processing unit
31110 Sign prediction unit
312, 106 Addition unit
320 Prediction parameter derivation unit
11 Video coding apparatus
102 Subtraction unit
103 Transform and quantization unit
104 Entropy coder
110 Coding parameter determination unit
111 Parameter coder
120 Prediction parameter derivation unit

The invention claimed is:

1. A video decoding apparatus comprising:
a parameter decoder that decodes a transform coefficient and a coefficient sign prediction error from coded data; and
a sign prediction circuitry that predicts a sign of the transform coefficient, wherein
the sign prediction circuitry:
divides signs of the transform coefficients without the sign information into a plurality of groups and predicts the signs of transform coefficients of each groups based on a cost with reference to a boundary pixel with a neighboring block,
performs the prediction of the sign for each group sequentially,
derives the cost for a group to be processed N-th, by setting the value of the transform coefficient whose sign is not determined at the time of processing the sign to zero,
derives the cost for groups to be processed after the N-th, by using the sign determined for the groups processed up to the N-th group, and
modifies the predicted sign of the transform coefficient, using the coefficient sign prediction error.

2. The video decoding apparatus according to claim 1, wherein
the sign prediction circuitry changes a number of signs to be predicted, depending on a size of a target block.

3. The video decoding apparatus according to claim 1, wherein
the parameter decoder decodes a flag indicating whether to use non-separable transform in a target block, and only in a case that the flag indicates that a non-separable transform is not used, the sign prediction circuitry sets an internal variable equal to 1, the internal variable indicating whether to use sign prediction, and predicts the sign of the target block.

4. The video decoding apparatus according to claim 1, wherein
the parameter decoder decodes a parameter indicating whether to use non-separable transform, and in a case that the non-separable transform is not used, the parameter decoder decodes a parameter indicating whether to use sign prediction.

5. The video decoding apparatus according to claim 1, wherein
the parameter decoder decodes a parameter indicating whether to use a scaling matrix, and in a case that the scaling matrix is not used, the parameter decoder decodes a parameter indicating whether to use sign prediction.

6. The video decoding apparatus according to claim 1, wherein
the transform coefficients of the group to be processed N-th are located on a lower frequency side in a scan order than the transform coefficients of the group to be processed (N+1)-th.

7. The video decoding apparatus according to claim 1, wherein
absolute values of the transform coefficients of the group to be processed N-th are equal to or greater than absolute values of the transform coefficients of the group to be processed (N+1)-th.

8. A video coding apparatus comprising:
a parameter coder that codes a transform coefficient and a coefficient sign prediction error; and
a sign prediction circuitry that predicts a sign of the transform coefficient, wherein
the sign prediction circuitry:
divides signs of the transform coefficients without the sign information into a plurality of groups and predicts the signs of transform coefficients of each groups, based on a cost with reference to a boundary pixel with a neighboring block, performs the prediction of the sign for each group sequentially,
derives the cost for a group to be processed N-th, by setting the value of the transform coefficient whose sign is not determined at the time of processing the sign to zero,
derives the cost for groups to be processed after the N-th, by using the sign determined for the groups processed up to the N-th group, and
modifies the predicted sign of the transform coefficient, using the coefficient sign prediction error.

9. The video coding apparatus according to claim 8, wherein
the transform coefficients of the group to be processed N-th are located on a lower frequency side in a scan order than the transform coefficients of the group to be processed (N+1)-th.

10. The video coding apparatus according to claim 8, wherein
absolute values of the transform coefficients of the group to be processed N-th are equal to or greater than absolute values of the transform coefficients of the group to be processed (N+1)-th.

11. A video decoding method including:
decoding a transform coefficient and a coefficient sign prediction error from coded data;
dividing signs of the transform coefficients without the sign information into a plurality of groups; and
predicting the signs of transform coefficients of each groups based on a cost with reference to a boundary pixel with a neighboring block,
wherein
the prediction of the sign for each group is performed sequentially,
the cost for a group to be processed N-th is derived by setting the value of the transform coefficient whose sign is not determined at the time of processing the sign to zero,
the cost for groups to be processed after the N-th is derived by using the sign determined for the groups processed up to the N-th group, and
the predicted sign of the transform coefficient is modified by using the coefficient sign prediction error.

* * * * *